United States Patent
Hosseini et al.

(10) Patent No.: US 10,892,928 B2
(45) Date of Patent: Jan. 12, 2021

(54) DOWNLINK CONTROL CHANNEL STRUCTURE FOR LOW LATENCY COMMUNICATIONS

(71) Applicant: QUALCOMM Incorporated, San Diego, CA (US)

(72) Inventors: Seyedkianoush Hosseini, San Diego, CA (US); Shimman Arvind Patel, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/953,878

(22) Filed: Apr. 16, 2018

(65) Prior Publication Data

US 2018/0324018 A1  Nov. 8, 2018

Related U.S. Application Data

(60) Provisional application No. 62/502,505, filed on May 5, 2017.

(51) Int. Cl.
*H04L 27/26* (2006.01)
*H04W 72/04* (2009.01)
(Continued)

(52) U.S. Cl.
CPC ........ *H04L 27/2613* (2013.01); *H04L 5/0007* (2013.01); *H04L 5/0044* (2013.01);
(Continued)

(58) Field of Classification Search
CPC . H04L 5/0007; H04L 27/2613; H04W 72/042
See application file for complete search history.

(56) References Cited

U.S. PATENT DOCUMENTS

| 2018/0049189 | A1* | 2/2018 | Hugl | H04W 72/042 |
| 2018/0279344 | A1* | 9/2018 | Bagheri | H04W 72/042 |
| 2018/0359068 | A1* | 12/2018 | Kim | H04W 72/0446 |

FOREIGN PATENT DOCUMENTS

WO   WO-2017136079 A1 *  8/2017  .......... H04L 5/0094

OTHER PUBLICATIONS

Bagheri et al., U.S. Appl. No. 62/476,666 specification dated Mar. 24, 2017, pp. 1-27 (provisional for US 2018/0279344 A1). (Year: 2017).*

(Continued)

*Primary Examiner* — Kodzovi Acolatse
*Assistant Examiner* — Farhad Ali
(74) *Attorney, Agent, or Firm* — Dalei Dong; Harrity & Harrity LLP

(57) ABSTRACT

Methods, systems, and devices for wireless communication are described. In some aspects, a user equipment (UE) may identify a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the UE for the sTTI, and wherein the control region and the data region are frequency division multiplexed. The UE may obtain content in the sTTI based at least in part on the control information. Numerous other aspects are provided.

32 Claims, 20 Drawing Sheets

(51) Int. Cl.
*H04L 5/00* (2006.01)
*H04W 72/12* (2009.01)

(52) U.S. Cl.
CPC .......... *H04L 5/0051* (2013.01); *H04L 5/0053* (2013.01); *H04L 27/2602* (2013.01); *H04W 72/042* (2013.01); *H04L 27/261* (2013.01); *H04W 72/1289* (2013.01)

(56) References Cited

OTHER PUBLICATIONS

Huawei, et al., "sPDCCH Multiplexing with Data", 3GPP Draft; R1-1704265, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), 6 Pages, XP051242417, Retrieved from the Internet: URL: http://www.3gpp.org/ftp/Meetings_3GPP_SYNC/RAN1/Docs/ [retrieved on Apr. 2, 2017].
International Search Report and Written Opinion—PCT/US2018/027903—ISA/EPO—dated Jul. 19, 2018.
Qualcomm Incorporated: "Shortened PDCCH and Data Multiplexing", 3GPP Draft; R1-1704988 Shortened PDCCH and Data Multiplexing, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), 6 Pages, XP051243119, Retrieved from the Internet: URL: http://www.3gpp.org/ftp/Meetings_3GPP_SYNC/RAN1/Docs/ [retrieved on Apr. 2, 2017].

\* cited by examiner

DOWNLINK CONTROL CHANNEL STRUCTURE FOR LOW LATENCY COMMUNICATIONS

CROSS-REFERENCE TO RELATED APPLICATIONS UNDER 35 U.S.C. § 119

This application claims priority to U.S. Provisional Patent Application No. 62/502,505, filed May 5, 2017, entitled "DOWNLINK CONTROL CHANNEL STRUCTURE FOR LOW LATENCY COMMUNICATIONS," which is hereby expressly incorporated by reference herein.

BACKGROUND

The following relates generally to wireless communication, and more specifically to a downlink control channel structure for low latency communications.

Wireless communications systems are widely deployed to provide various types of communication content such as voice, video, packet data, messaging, broadcast, and so on. These systems may be capable of supporting communication with multiple UEs by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station may transmit information to one or more UEs using a transmission time interval (TTI) that is reduced in length. Such a TTI may be referred to as a shortened TTI (sTTI), and a UE receiving information in an sTTI may be a low latency UE. An sTTI may be divided into a number of blocks across a system bandwidth. The blocks may be allocated to one or more UEs by a base station. The base station may transmit control information or a control message in a first portion of the block to provide resource allocations for UEs. A low latency UE may attempt to decode the control information in the block. As sTTIs become shorter, it is ever more important to reduce the control overhead. Thus, it is desirable to efficiently communicate control information, and minimize the amount of processing time required for a UE to receive and decode the control information. Furthermore, a configuration of the blocks should be flexible to account for different scenarios.

SUMMARY

In an aspect of the disclosure, a method, an apparatus, and a computer program product are provided.

In some aspects, the method may be performed by a user equipment (UE), and may include identifying a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the UE for the sTTI, and wherein the control region and the data region are frequency division multiplexed; and obtaining content in the sTTI based at least in part on the control information.

In some aspects, the apparatus may include a memory and at least one processor coupled to the memory. The at least one processor may be configured to identify a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the apparatus for the sTTI, and wherein the control region and the data region are frequency division multiplexed; and obtain content in the sTTI based at least in part on the control information.

In some aspects, the apparatus may include means for identifying a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the apparatus for the sTTI, and wherein the control region and the data region are frequency division multiplexed; and means for obtaining content in the sTTI based at least in part on the control information.

In some aspects, the computer program product may include a non-transitory computer-readable medium storing computer executable code. The code may include code for identifying a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the sTTI, and wherein the control region and the data region are frequency division multiplexed; and code for obtaining content in the sTTI based at least in part on the control information.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
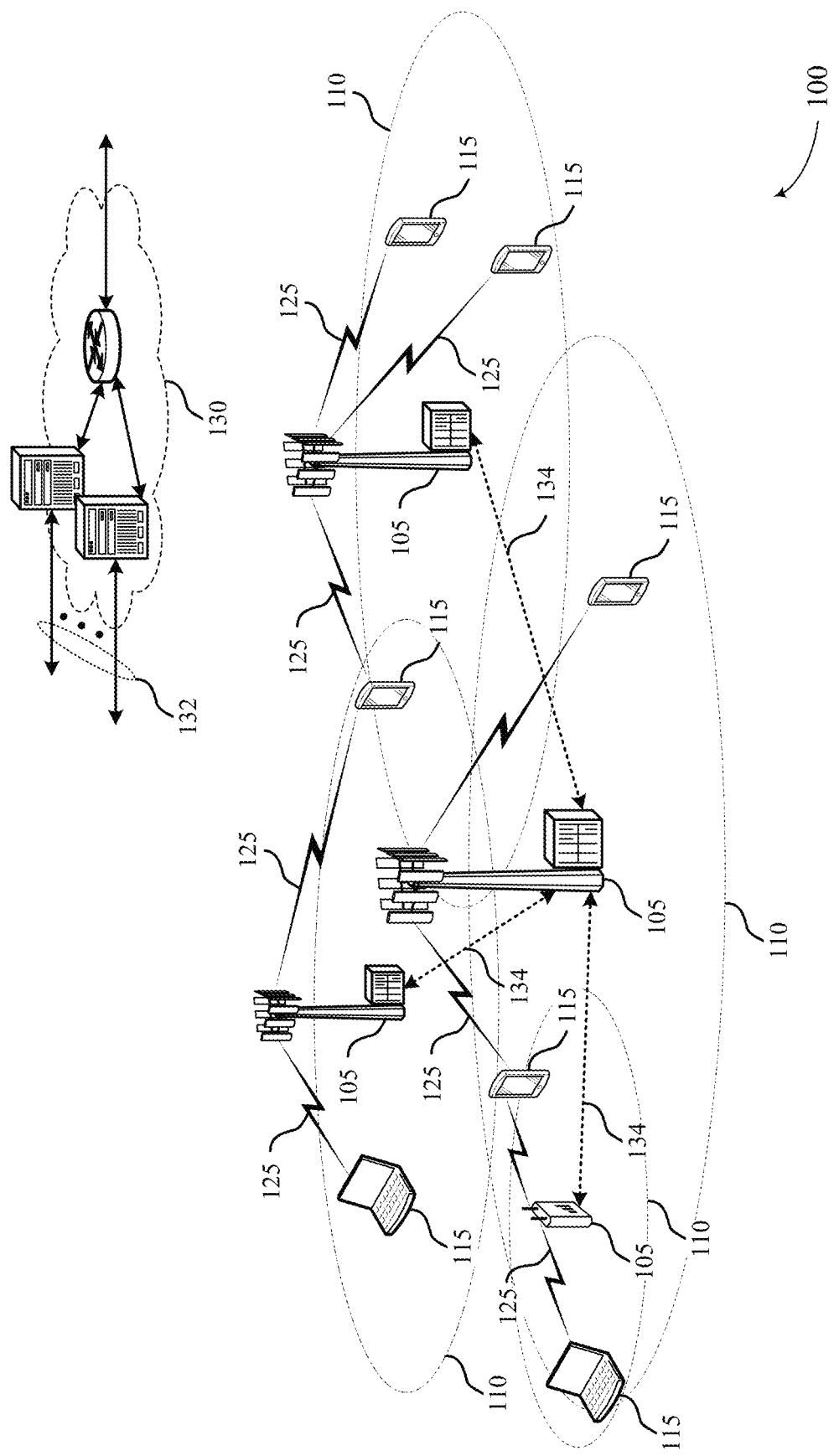
FIG. 1 illustrates an example of a system for wireless communication that supports downlink control channel structures for low latency communications, in accordance with various aspects of the present disclosure.

Control channels for low latency transmissions may be designed, mapped, and communicated to decrease signaling overhead and to increase the availability of resources for low latency data channels. Data channels using reduced length transmission time intervals (TTIs) (e.g., including a shortened TTI (sTTI)) may encounter a number of challenges, including the need to efficiently support multiple low latency UEs, as well as legacy UEs, while allowing for the efficient reception and decoding of control information. An sTTI may include multiple resource management blocks for downlink transmissions of data. Certain resources within the sTTI may have already been allocated for other types of transmission. Such non-low latency transmissions that may be scheduled within the sTTI may include legacy data transmissions in a physical downlink control channel (PDSCH) within a portion of the system bandwidth also used by the low latency UEs, narrowband internet-of-things (NB-IOT) type transmission, or common signals, such as a cell-specific reference signal (CRS), primary synchronization signal (PSS), secondary synchronization signal (SSS), or physical broadcast channel (PBCH), or other signals reserved by higher level signaling, such as radio resource control (RRC) signaling.

Efficient coexistence between low latency and non-low latency transmissions may increase capacity and transmission efficiency. A control region may be located at the beginning of a resource management block, and a UE may receive and decode control information received in the control region to determine that the data region of the resource management block has been allocated for that UE. Mechanisms to provide for efficient reception and decoding of this control information are desired. In addition, reducing the size of the control region, or otherwise maximizing the size of the data region of the resource management block relative to the control region, or even eliminating one or more of the control regions from one or more of the resource management blocks of the sTTI to minimize the impact of control overhead are desired.

In some aspects, a UE may identify a resource management block based at least in part on a resource management block configuration indicated by a base station. The resource management block may span a portion of a system bandwidth in an sTTI. The UE may identify a resource block set that is a self-contained subset of the resource management block. The resource block set may include control information for the UE for the sTTI. The UE may use the control information to locate content, intended for the UE, at least partially within a data region of the sTTI.

Aspects of the disclosure introduced above are described below in the context of a wireless communications system. Resource allocation diagrams and resource structures are then illustrated to describe aspects of the disclosure. Aspects of the disclosure are further illustrated by and described with reference to apparatus diagrams, system diagrams, and flowcharts that relate to downlink control channel structure for low latency communications.

FIG. 1 illustrates an example of a wireless communications system 100, in accordance with various aspects of the present disclosure. The wireless communications system 100 includes base stations 105, UEs 115, and a core network 130. In some examples, the wireless communications system 100 may be a LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a base station 105 and a user equipment (UE) 115 may communicate using more than one carrier. Each aggregated carrier is referred to as a component carrier (CC). Each component can have a bandwidth of, e.g., 1.4, 3, 5, 10, 15 or 20 MHz. In some cases, the number of CCs can be limited to, e.g., a maximum of five 20 MHz carriers, giving maximum aggregated bandwidth is 100 MHz. In frequency division duplexing (FDD), the number of aggregated carriers can be different in downlink (DL) and uplink (UL). The number of UL component carriers may be equal to or lower than the number of DL component carriers. The individual component carriers can also be of different bandwidths. For time division duplexing (TDD), the number of CCs as well as the bandwidths of each CC will normally be the same for DL and UL. Component carriers may be arranged in a number of ways. For example, a carrier aggregation (CA) configuration may be based at least in part on contiguous component carriers within the same operating frequency band, i.e., called intra-band contiguous CA. Non-contiguous allocations can also be used, where the component carriers may be either be intra-band, or inter-band.

Wireless communications systems are widely deployed to provide various types of communication content such as voice, video, packet data, messaging, broadcast, and so on. These systems may be capable of supporting communication with multiple UEs by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

A base station 105 may communicate with one or more of UEs 115 using low latency transmissions, for example using sTTIs. An sTTI may be divided into a number of resource management blocks, one or more of which may include a control region, also referred to as a resource block set. The control region may include a downlink grant for a low latency UE 115, for example indicating a data region of the resource management block is for the UE 115 to receive data. In some aspects, the base station 105 may indicate a resource management block configuration to the UE 115 (e.g., during RRC connection configuration). The resource management block configuration may identify a plurality of resource management blocks that span at least a portion of system bandwidth and are allocated in an sTTI. The UE 115 may identify the resource management block based at least in part on the resource management block configuration indicated by the base station 105. The UE 115 may identify a resource block set (e.g., a control region) that is a self-contained subset of the resource management block. The resource block set may include control information for the sTTI (and/or one or more other sTTIs). For example, the base station 105 may transmit control information for the sTTI in the resource block set. The UE 115 may use the control information to locate content, intended for the UE 115, at least partially within a data region of the sTTI.

In some aspects, a downlink grant transmitted in the control region of a resource management block may be both for the resource management block in which the downlink grant is sent by a base station 105 (or received at a UE 115) and for a second resource management block within the same TTI. In particular, the downlink grant may include an indication (e.g., a field made up of a number of bits that is one less than the total number of resource management blocks in the TTI) to inform the UE 115 that the downlink grant, in addition to being for data to be received by the UE 115 in a data region of the resource management block, is also for the UE 115 to receive data in a data region of one or more of the other resource management blocks in the TTI.

In addition to a downlink grant in a control region of the TTI, the control region may include one or more uplink grants. One of the uplink grants may be for the same UE 115 as the downlink grant. Other uplink grants may be for different UEs 115 than the downlink grant. The downlink grant may be at the beginning of the control region, against a first boundary of the control region, and the one or more uplink grants may be at the end of the control region, against a second boundary of the control region. The size of the control region may be large enough so that, for the different possible aggregation levels, uplink grants and the downlink grant do not overlap in the control region. An unused portion of the control region, for example for lower aggregation levels, may be reallocated to the data region. An indication of the start of the uplink grants may be provided in the downlink grant of the control region so that, in conjunction with knowledge by the UE 115 of the end of its downlink grant, UE 115 may identify the reallocated data region within the control region.

As indicated above, FIG. 1 is provided as an example. Other examples are possible and may differ from what was described in connection with FIG. 1.

Figure 2:
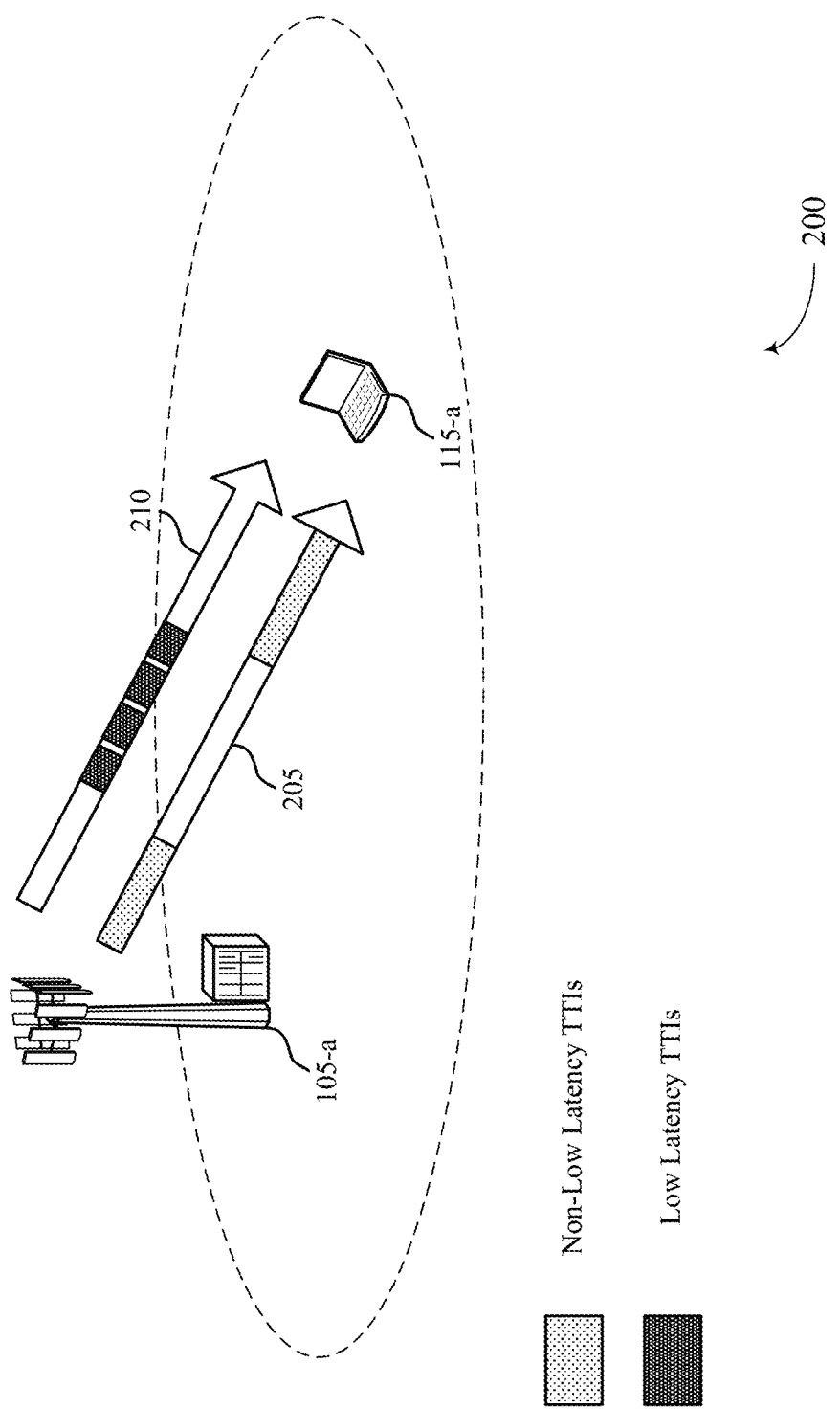
FIG. 2 illustrates an example of a wireless communications system that supports downlink control channel structures for low latency communications, in accordance with various aspects of the present disclosure.

FIG. 2 illustrates an example of a wireless communications system 200 for downlink control channel structures for low latency communications, in accordance with various aspects of the present disclosure. Wireless communications system 200 includes one or more base stations 105-*a* and UEs 115-*a*, which may be examples of aspects of a UE 115 as described with reference to FIG. 1. Base station 105-*a* may transmit resource allocations and other control information in one or more shortened physical downlink control channel (sPDCCH) transmissions to UE 115-*a*. The resource allocations may include one or both of downlink grants and uplink grants of resources for transmission of downlink data (e.g., in a shortened physical downlink shared channel (sPDSCH)) and uplink data (e.g., in a shortened physical uplink shared channel (sPUSCH)) for UE 115-*a*. Wireless communications system 200 may support non-low latency communication 205 and a low latency communication 210. Resources for low latency communication 210 may be time division multiplexed and/or frequency division multiplexed with non-low latency communication 205.

An sTTI for low latency communications may have multiple resource management blocks, which may span the whole system bandwidth or a portion of the system bandwidth. The resource management blocks may have the same or different sizes in frequency. Each resource management block may be allocated for a single UE or multiple UEs. The UEs may access one, multiple, or all of the resource management blocks of the sTTI, depending on a resource management block configuration. The resource management block structure used may be defined by higher level signaling (e.g., in an RRC connection configuration message), for example for a semi-static configuration.

A resource management block may have an sPDCCH associated with the resource management block. In some aspects, the sPDCCH may be referred to as a control region or a resource block set. The sPDCCH may be embedded in the resource management block (e.g., may be self-contained within the resource management block). The sPDCCH may be at the beginning of the resource management block (e.g., in the first one or more symbols of the resource management block) to enable early decoding of the sPDCCH in the resource management block. The sPDCCH may span the bandwidth of the resource management block, or may occupy less than the full bandwidth of the resource management block, with additional signaling included above (e.g., at a higher frequency) and/or below (e.g., at a lower frequency) the resource elements occupied by the sPDCCH in the resource management block.

In some cases, an sPDCCH may allocate an sPDSCH for a low latency UE to a resource management block that has already been allocated to a PDSCH for some other UEs (e.g., legacy UEs) in a TTI. The TTI may overlap in whole or in part with at least one sTTI. That is, a PDSCH allocation of a TTI may overlap in whole or in part with a resource management block of an sTTI. A transmission with a PDCCH (e.g., which may be referred to as a legacy or regular PDCCH) for a TTI may include an indication of the PDSCH resource allocation within the TTI. For example, a PDSCH indicated by the PDCCH may be allocated to a set of frequency resources. A low latency UE may be configured to monitor for such PDCCHs (e.g., receive and decode legacy PDCCHs) in addition to sPDCCHs. The low latency UE may thus receive and decode the indication in the PDCCH and identify the PDSCH resource allocation.

The low latency UE may also receive an sPDCCH identifying an sPDSCH of a resource management block of an sTTI for the low latency UE, the resource management block also including the regular or legacy PDSCH resource allocation. The low latency UE, having received the indication for the PDSCH, may determine a location of the PDSCH within the sTTI. Based at least in part on the indication, the low latency UE may then determine that the sPDSCH associated with the sPDCCH that the low latency UE has received, for example based at least in part on a downlink grant in the sPDCCH, is frequency division multiplexed with the regular or legacy PDSCH. Thus, the low latency UE may receive low latency data in an sPDSCH even in the presence of a legacy PDSCH resource allocation within the sTTI be monitoring for and identifying an indicator in the legacy or regular PDCCH.

In other cases, an sPDCCH for one resource management block within an sTTI for a UE may include a downlink grant for one or more additional resource management blocks within the sTTI for the same UE. For example, as described above, the sPDCCH may be in the first portion of the sTTI block (e.g., in the first symbol of the sTTI) at a predefined location within the resource management block of the sTTI. A low latency UE may monitor the control region (e.g., the sPDCCH) for each sTTI resource management block to determine whether a downlink grant of resources has been sent (e.g., from a serving base station 105-*a*) in the sPDCCH to the low latency UE. A low latency UE may search for both uplink and downlink grants in the sPDCCH. In some examples, a two stage grant for the low latency UE may be used, where the first stage grant, received in messaging sent during a time interval prior to the sTTI, specifies an aggregation level associated with the resource management blocks of the sTTI.

As described above, an sPDCCH may be positioned at the beginning of a resource management block of an sTTI. In addition, a downlink grant of the sPDCCH may be positioned at the beginning of the sPDCCH. By providing the downlink grant for a low latency UE in a same position of each sPDCCH, a search space for the low latency UE may be reduced. In some examples, if a low latency UE searches for a control message, for example a downlink grant of resources, for that UE in an sPDCCH, and successfully identifies such a downlink grant is present, the low latency UE may infer that the associated sPDSCH of that resource management block is allocated for that low latency UE. Thus, the low latency UE may efficiently identify the sPDSCH allocated to that UE.

In addition, the downlink grant may include one or more bits to indicate other resource management blocks of the sTTI that include an sPDSCH for that same low latency UE. The one or more bits may be, for example, resource assignment information. Each of the one or more bits may indicate whether or not a resource management block is allocated for the same low latency UE. For example, where an sTTI includes three resource management blocks, two bits in the downlink grant in an sPDSCH of one resource management block may be used to indicate whether the downlink grant is for any of the other three resource management blocks for the low latency UE. Downlink grants in other of the resource management blocks may be for other low latency UEs, and may likewise indicate that the sPDSCH in the resource management block containing the sPDCCH with the downlink grant is for that other low latency UE, and one or more bits (e.g., two bits for three resource management blocks), used to indicate whether any of the other resource management blocks are for the other low latency UE. The bits may be appropriately indexed and the resource management block to which they relate based at least in part on a position of the resource management block in which the one or more bits of the downlink grant appear. The above-described procedure may efficiently indicate downlink grants at least in part because a low latency UE may only need to perform a blind decode in a fixed position of the sPDCCH within the resource management block, and a number of blind decodes used to determine the downlink grant may be limited to a number of resource management blocks configured by a base station 105-*a* (e.g., cell) in the sTTI.

As described above, a downlink grant may have a position at the beginning of an sPDCCH. In some cases, one or more uplink grants for low latency UEs may be positioned in an sPDSCH of an sTTI that already contains a downlink grant for a low latency UE, where the uplink grant may be for a different low latency UE than the low latency UE that the downlink grant is for. As described above, a first stage grant may specify an aggregation level. The one or more uplink grants may be sent at the specified aggregation level. Where other aggregation levels are specified, the uplink grants may be sent according to other specified aggregation levels.

The uplink grants of an sPDCCH already containing a downlink grant may be separated from the downlink grants. For example, the downlink grants may be transmitted at the beginning of the sPDCCH control region, and the uplink grants may be sent at the end of the sPDCCH control region. As used herein, the sPDCCH control region may be a virtual control region, for example meaning that the resource elements of the sPDCCH may not all be adjacent in the time-frequency domain. The downlink and uplink grants of an sPDCCH may be separated at least in part so that the downlink and uplink grant search spaces do not overlap. Providing the downlink grant at a fixed position relative to a boundary of the sPDCCH control region, and uplink grants at a fixed position relative to another boundary of the sPDCCH control region may reduce the number of blind decode attempts for a low latency UE. In addition, because a downlink grant may be received at a set or predetermined position that is separated from a search space for the one or more uplink grants, UE 115-a may begin to decode the downlink grant prior to completing a blind decoding process for the uplink grants. In some cases, downlink grant processing and uplink grant blind decoding may proceed in parallel, increasing efficiency by decreasing the amount of time needed for UE 115-a to receive and process an sPDCCH.

A position of each of the uplink grants to be transmitted in an sPDCCH may be determined by a transmitting base station 105-a based at least in part on the uplink grant aggregation level. As described above, base station 105-a may transmit an indication of the uplink grant aggregation level to a low latency UE in a prior grant message. The base station 105-a may statically define uplink grant locations for each of multiple aggregation levels. In other examples, multiple uplink grant locations may be defined for a particular aggregation level. Multiple uplink grant locations may result in a greater number of blind decoding attempts by receiving UE 115-a since there are an increased number of potential uplink grant locations for the UE 115-a.

In some examples, the size of the sPDCCH control region may be sized at least large enough to accommodate a nominal level of grants and aggregation levels without overlap of the downlink grants and uplink grants at the various aggregation levels. As such, a portion of the sPDCCH control region may be unused. The size of the unused portion of the sPDCCH control region may depend on a number of uplink grants and the aggregation level for a particular sPDCCH. This unused sPDCCH control region may be repurposed by including an indication in the downlink grant of the sPDCCH (e.g., an sPDCCH rate matching information field) that indicates the start of the uplink grants in the sPDCCH. The UE 115-a that holds the downlink grant may rate match the sPDSCH data region around the downlink grant and uplink grants, if any, to use this otherwise unallocated portion of the sPDCCH as an additional portion of the sPDSCH. The size of this indicator may provide the number of available positions to start the uplink grans in the sPDCCH. For example, where the indictor includes three bits, one of eight possible positions for the start of the uplink grants may be indicated.

As indicated above, FIG. 2 is provided as an example. Other examples are possible and may differ from what was described in connection with FIG. 2.

Figure 3:
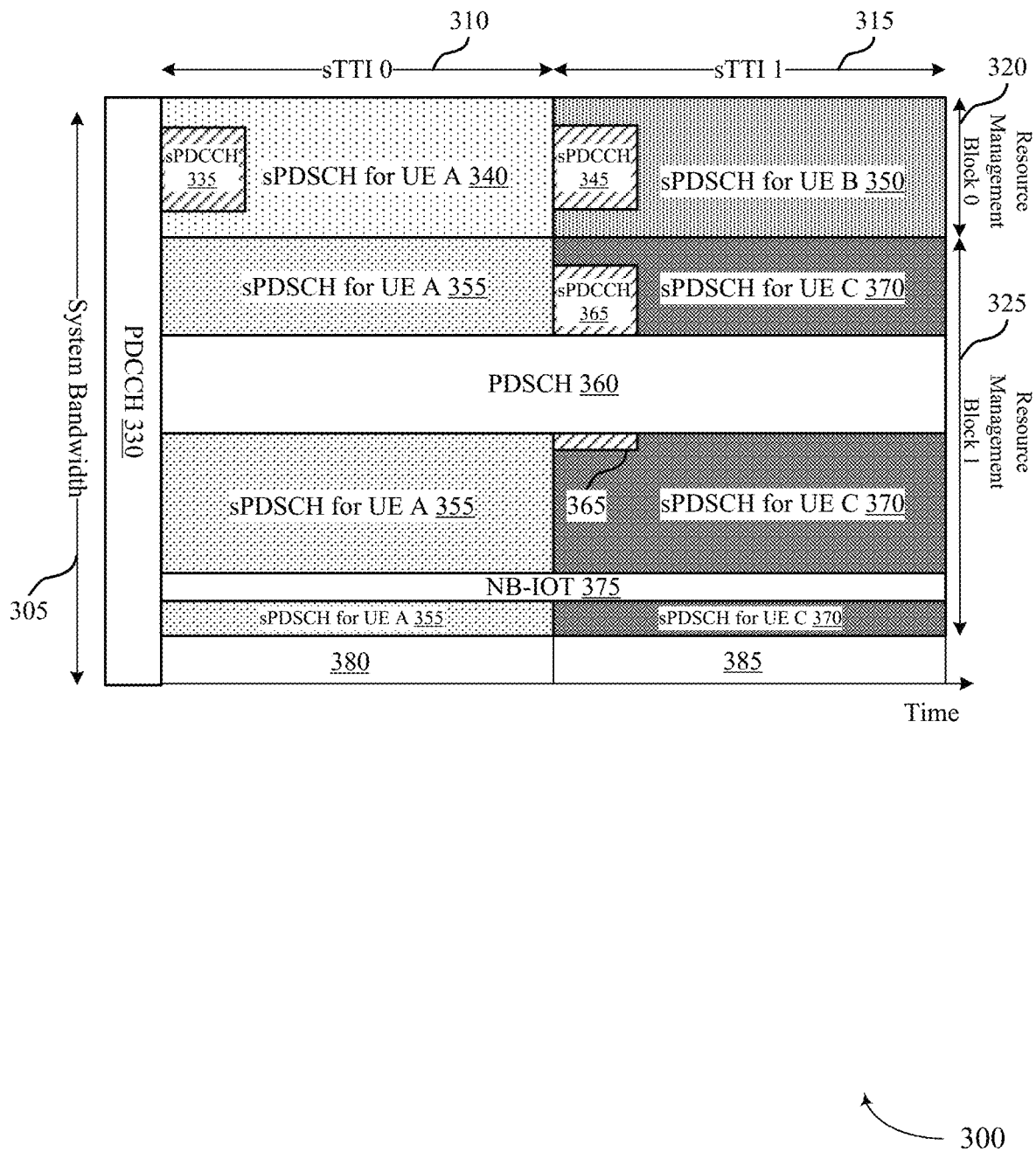
FIGS. 3, 4, 5A, and 5B illustrate examples of resource allocation diagrams for downlink control channel structures for low latency communications, in accordance with various aspects of the present disclosure.

FIG. 3 illustrates an example of a resource allocation diagram 300 for downlink control channel structures for low latency communications, in accordance with various aspects of the present disclosure. Resource allocation diagram 300 shows a system bandwidth 305, and two sTTIs: sTTI 310 and sTTI 315. sTTI 310 and sTTI 315 may be examples of low latency communication 210 described with reference to FIG. 2. In this example, each sTTI is associated with two resource management blocks, resource management block 320 and resource management block 325. The resource management blocks 320 and 325 need not necessarily span the entire system bandwidth 305. For example, unallocated region 380 and unallocated region 385 in sTTI 310 and sTTI 315, respectively, may be within the system bandwidth, but not allocated as a low latency resource management block.

PDCCH 330, which in some examples may be included at the start of a subframe, may be transmitted by a base station 105 for a TTI associated with that subframe. PDCCH 330, which may be a legacy or otherwise regular PDCCH, may allocate resources within the TTI. In particular, in resource allocation diagram 300, PDCCH 330 may allocate PDSCH 360. PDCCH 330 may include a control message, receivable by a low latency UE, indicating the allocation of PDSCH 360 within the system bandwidth 305. PDSCH 360 may have a duration of 1 ms in some examples. Base station 105 may allocate resource management block 320 and resource management block 325 of sTTI 310 to a low latency UE, UE A; resource management block 320 of sTTI 315 to a low latency UE, UE B; and resource management block 325 of sTTI 315 to a low latency UE, UE C. The base station 105 may include sPDCCH 335 (e.g., a control region or resource block set) allocating resources (e.g., by including a first DL grant in the sPDCCH 335) to sPDSCH 340 for UE A in a control region of resource management block 320 of sTTI 310. In addition, sPDCCH 335 may allocate resources (e.g., by including a second DL grant in the sPDCCH 335) to sPDSCH 355 for UE A in a control region of resource management block 325 of sTTI 310. In this example, base station 105 may frequency division multiplex sPDSCH 355 with PDSCH 360, such that an sPDSCH 355 includes portions both above and below PDSCH 360 in frequency. The base station 105 may provide a control message, for example an indication, in PDCCH 330 that it has allocated PDSCH 360 to UE A. Receiving UE A may then monitor for and read the indication in PDCCH 330 that PDSCH 360 has an allocation, so that UE A, after receiving the downlink grant in sPDCCH 335, receive data in the sPDSCH 355 data region on either side of PDSCH 360.

In sTTI 315, sPDCCH 345 may allocate resources for sPDSCH 350 in resource management block 320, and sPDCCH 365 may allocate resources for sPDSCH 370 in resource management block 325. In this example, base station 105 may frequency division multiplex both sPDCCH 365 and sPDSCH 370 with PDSCH 360, such that sPDCCH 365 includes portions both above and below PDSCH 360 in frequency, and sPDSCH 370 includes portions both above and below PDSCH 360 in frequency. Receiving UE C, monitors for and receives the indication in PDCCH 330 that PDSCH 360 has an allocation with sTTI 315. UE C then monitors for and receives the control message of sPDCCH 365 to determine that UE C has an allocation of sPDSCH 370 and receives data in the sPDSCH 370 data region on either side of PDSCH 360.

Similarly, an sPDCCH and/or sPDSCH may be frequency division multiplexed around other signals transmitted during sTTI 310 and sTTI 315 as illustrated for resource allocation diagram 300. In one example, a narrowband internet-of-things (NB-IOT) transmission 375 may be reserved to be sent during sTTI 310 and sTTI 315 by RRC signaling. Base station 105 may frequency division multiplex (or rate match) around NB-IOT transmission 375. In other example, one or more resource management blocks may be reserved for a common signal, for example a CRS, PSS, SSS, or PBCH, or other signals reserved by higher level signaling, such as RRC signaling.

As described above, the control message in the legacy PDCCH in one TTI may identify a data region, such as a PDSCH or NB-IOT, or common signaling, such as PSS, SSS, CRS, or PBCH, that a low latency UE (or UE 115) can use to identify a resource allocation in an sTTI containing one or more resource management blocks allocated to the low latency UE. The low latency UE may then receive low latency data, for example in a PDSCH, of a data region of one or more of the resource management blocks, where the data is frequency domain multiplexed with the data region identified by the control message in the legacy PDCCH.

As indicated above, FIG. 3 is provided as an example. Other examples are possible and may differ from what was described in connection with FIG. 3.

Figure 4:
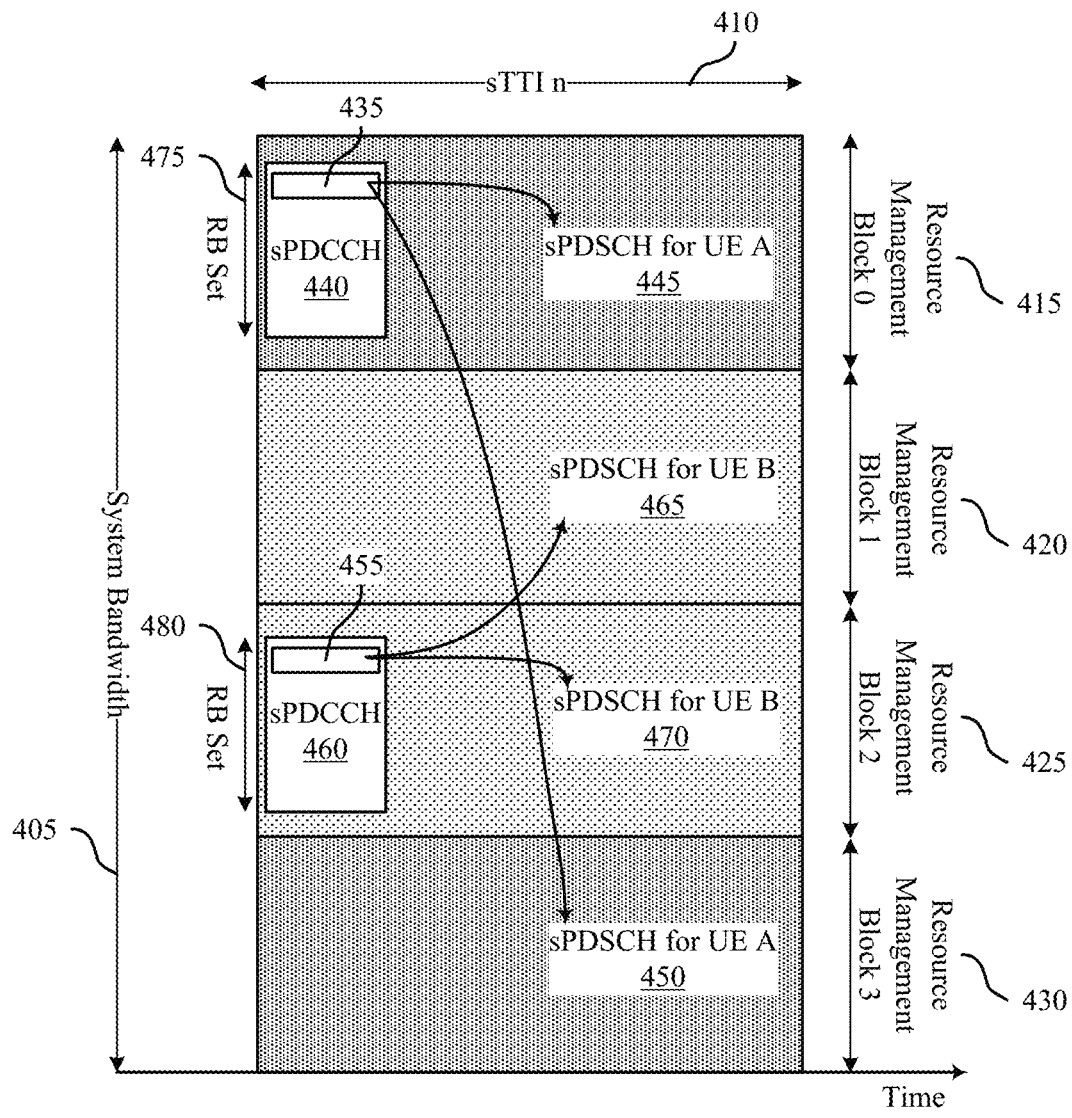

FIG. 4 illustrates an example of a resource allocation diagram 400 for downlink control channel structures for low latency communications, in accordance with various aspects of the present disclosure. Resource allocation diagram 400 includes one of sTTI 410 having a system bandwidth 405. sTTI 410 may represent an sTTI within a legacy TTI, or a separate TTI. In some examples, and as may be the case with other sTTI described here, sTTI 410 may be of different durations, for example a single symbol period, two symbol periods, three symbol periods, a single slot width associated with a legacy TTI, etc. In this example, sTTI 410 includes four resource management blocks: resource management block 415 and resource management block 430 for UE A, and resource management block 420 and resource management block 425 for UE B.

A base station 105 may generate a downlink grant 435 to be included in an sPDCCH 440, the control region of resource management block 415. The sPDCCH 440 may be, for example, in a first symbol period of the resource management block 415. The downlink grant 435 may be for an sPDSCH 445 in a data region of the resource management block 415 that contains the downlink grant. The downlink grant may also be for a second sPDSCH, sPDSCH 450, in a data region of resource management block 430 that are also for UE A, to be jointly used to receive data at UE A based at least in part on the control information of downlink grant 435. In some aspects, sPDCCH 440 (e.g., a control region of resource management block 415) may be referred to as a resource block (RB) set 475.

A base station 105 may also generate a second downlink grant 455 to be included in an sPDCCH 460, the control region of resource management block 425. The second downlink grant 455 may be for the sPDSCH 470 of the resource management block 425, and may also be for the sPDSCH for resource management block 420. In some aspects, sPDCCH 460 (e.g., a control region of resource management block 425) may be referred to as a resource block set 480.

For both downlink grants, one or more bits in each of downlink grant 435 and downlink grant 455 may be generated by a transmitting base station 105 to indicate other resource management blocks of the sTTI that include an sPDSCH for that same low latency UE. In this example, sTTI 410 includes four resource management blocks. Downlink grant 435 for a UE A may thus include three bits to indicate whether the downlink grant 435 is for any of the other three resource management blocks for UE A.

In one example, the bits of the indication may make up or be a part of a resource allocation field in the downlink grant 435. In other examples, the bits of the indication may be included at another position in an sPDCCH, such as sPDCCH 440, or elsewhere within the control region of a resource management block, such as resource management block 415. The first bit of the indication may be associated with resource management block 420, the second bit may be associated with resource management block 425, and the third bit may be associated with resource management block 430. The receiving UEs, UE A and UE B may infer the relationship between the bits and the resource management blocks. For example, the first bit may be associated with the first resource management block of the sTTI 410 that does not contain the downlink grant having the bits of the indication, and so on. In the example shown in resource allocation diagram 400 for sTTI 410, in downlink grant 435 the third bit of the indication identifies the fourth resource management block 430 as for UE A. In downlink grant 455, the second bit of the indication identifies the second resource management block 420 as for UE B.

The above-described procedure may efficiently indicate downlink grants at least in part because a low latency UE may only need to perform a blind decode in a fixed position of the sPDCCH within the resource management block, and a number of blind decodes used to determine the downlink grant may be limited to a number of resource management blocks configured by a base station (e.g., cell) in the sTTI. Furthermore, the maximum number of bits in the indication of the downlink grant may also be limited to the number of resource management blocks of the sTTI minus one.

In some aspects, a base station 105 may indicate a resource management block configuration to a UE 115 (e.g., during RRC connection configuration). The resource management block configuration may identify a plurality of resource management blocks (e.g., resource management block 415, resource management block 420, resource management block 425, resource management block 430, and/or the like) that span at least a portion of system bandwidth 405 and are allocated in an sTTI 410. The UE 115 may identify a resource management block 415 based at least in part on the resource management block configuration indicated by the base station 105. The UE 115 may identify a resource block set 475 that is a self-contained subset of the resource management block 415. The resource block set 475 may include control information for the sTTI 410 (and/or one or more other sTTIs). For example, the resource block set 475 may be used to communicate a downlink grant 435. The UE 115 may use the control information to locate content, intended for the UE 115, at least partially within a data region of the sTTI 410.

As indicated above, FIG. 4 is provided as an example. Other examples are possible and may differ from what was described in connection with FIG. 4.

Figure 5A:
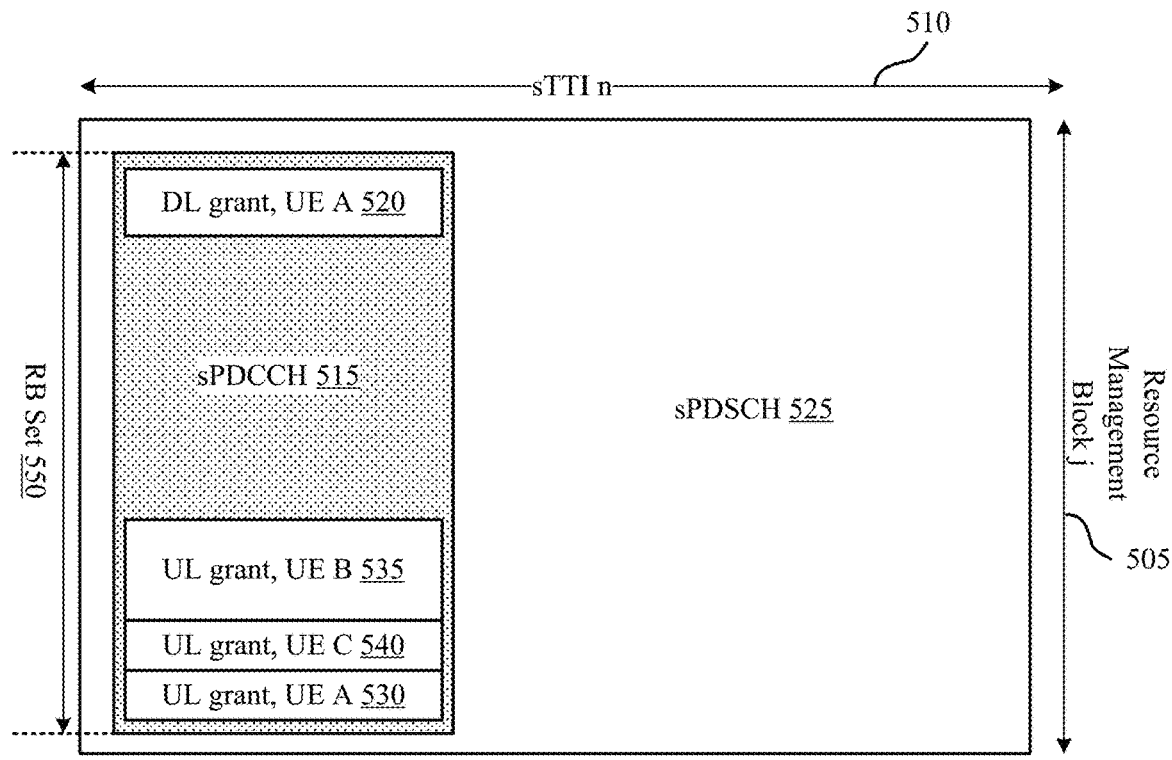
Figure 5B:
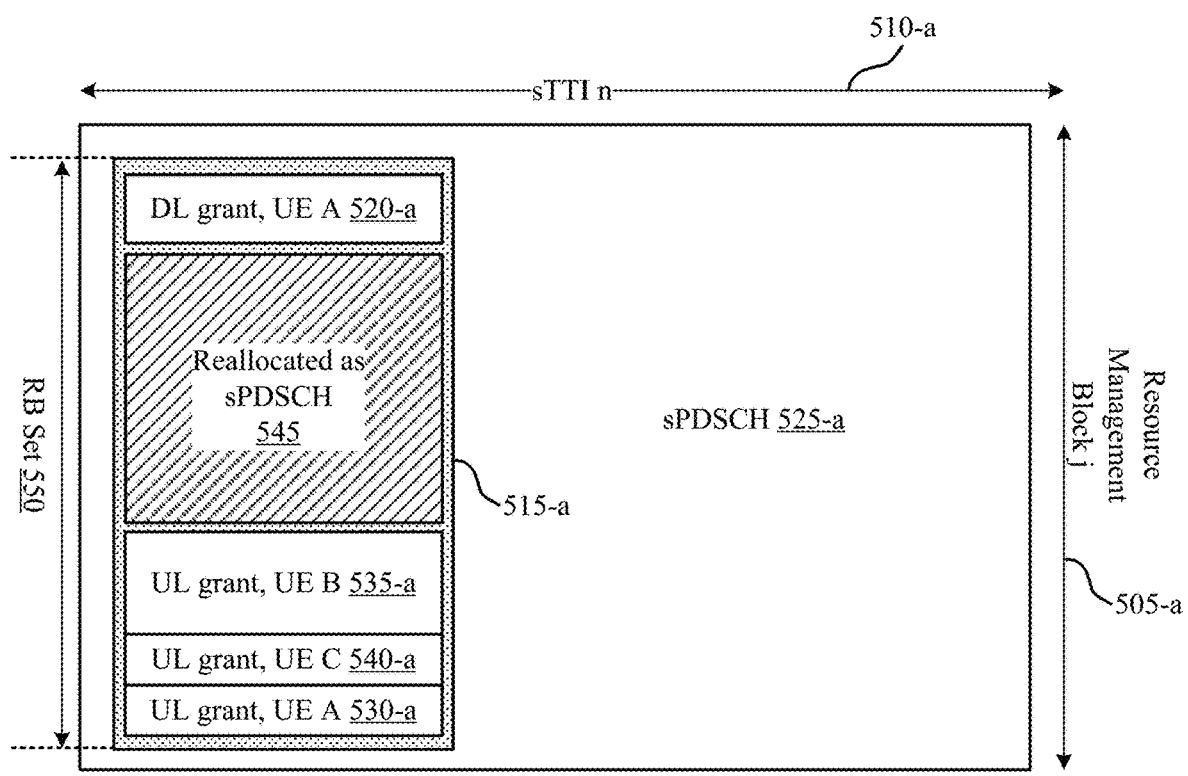

FIGS. 5A and 5B illustrate examples of resource allocation diagrams 501 and 502 for downlink control channel structures for low latency communications, in accordance with various aspects of the present disclosure.

Each of resource allocation diagrams 501 and 502 show a resource management block 505 for an sTTI 510, where the resource management block 505 includes a control region including sPDCCH 515 and a data region including sPDSCH 525 for UE A that is indicated by sPDCCH 515. The sPDCCH 515 may be or include one or more aspects of sPDCCH 335, sPDCCH 345, sPDCCH 365, sPDCCH 440, and sPDCCH 460. The sPDCCH 515 includes at least one downlink grant 520 for a UE A. Some examples of an sPDCCH 515 may include one more uplink grants for one or more UEs, which may also include an uplink grant for UE A. The examples of resource allocation diagrams 501 and 502 include uplink grant 530 for UE A, uplink grant 535 for UE B, uplink grant 540 for UE C. In some aspects, sPDCCH 515 (e.g., a control region of resource management block 425) may be referred to as a resource block set 550.

As illustrated in resource allocation diagrams 501 and 502, a downlink grant 520 may be at the beginning of the control region, sPDCCH 515, at a position at a first boundary of the sPDCCH 515 control region. The uplink grants may be clustered at the end of the control region, sPDCCH 515. The uplink grants may be transmitted by a base station 105 in sPDCCH 515 of resource management block 505 according to one of multiple different aggregation levels for UE A. In some examples, the aggregation level for UE A may have been indicated in a previously transmitted grant from base station 105. For example, a two-stage grant configuration may be used, such that the first grant in a previous transmission (e.g., a previous sTTI or TTI, such as a PDCCH in a previously-received TTI) may include the aggregation level for UE A, and the second grant may be the downlink grant 520. The uplink grant 530, uplink grant 535, and uplink grant 540 may be at the end of sPDCCH 515, with the uplink grant 530 for UE A at the end of sPDCCH 515 and located at a position at a second boundary of the sPDCCH 515 control region. Each of uplink grant 535 and uplink grant 540 may be at positions adjacent the uplink grant 530 for UE A. A size of sPDCCH 515 may be large enough such that for any aggregation level that can be indicated for UE A, the downlink grant 520 and multiple uplink grants do not overlap if the downlink grant 520 is at the beginning of sPDCCH 515 and the uplink grants are positioned at the end of sPDCCH 515.

The configuration of downlink grants at the beginning of sPDCCH 515 and uplink grants at the end of sPDCCH 515, may reduce the number of blind decode attempts for a UE. For example, one downlink grant for a UE may be at the beginning of sPDCCH 515. If an attempted blind decode at the beginning of sPDCCH is unsuccessful, the UE knows that the sPDSCH 525 is not for that UE.

As illustrated in resource allocation diagram 502, a portion of the control region for sPDCCH 515 (e.g., a portion of RB set 550) may be reallocated to be a part of data region for sPDSCH 525, recapturing unused control overhead from sPDCCH 515. Thus, reallocated sPDSCH 545 may be reallocated from a portion of the sPDCCH 515-*a* between downlink grant 520-*a* and the uplink grants, specifically an uplink grant 535-*a* for UE B. The size of reallocated sPDSCH 545 may depend in part on the aggregation level. The resources of sPDCCH 515-*a* that are to be used for reallocated sPDSCH 545 may be signaled in the downlink grant 520-*a*. In particular, an indication may identify the start of the uplink grant region, which may include uplink grant 530-*a*, uplink grant 535-*a*, and uplink grant 540-*a* for sPDCCH 515-*a*. In some examples, the indication may be rate matching information field, as further described below.

In some aspects, a base station 105 may indicate a resource management block configuration to a UE 115. The resource management block configuration may identify a plurality of resource management blocks that span at least a portion of system bandwidth and are allocated in an sTTI 510. The UE 115 may identify a resource management block 505, of the plurality of resource management blocks, based at least in part on the resource management block configuration indicated by the base station 105. The UE 115 may identify a resource block set 550 that is a self-contained subset of the resource management block 505. The resource block set 550 may be used to communicate control information for the sTTI 510 (and/or one or more other sTTIs). For example, the resource block set 550 may be used to communicate one or more downlink grants 520, one or more uplink grants 530, 535, 540, and/or the like. In some aspects, a portion of the resource block set 550 may be reallocated to the data region, shown as reallocated sPDSCH 545, thereby reducing control overhead.

As indicated above, FIGS. 5A and 5B are provided as examples. Other examples are possible and may differ from what was described in connection with FIGS. 5A and 5B.

Figure 6:
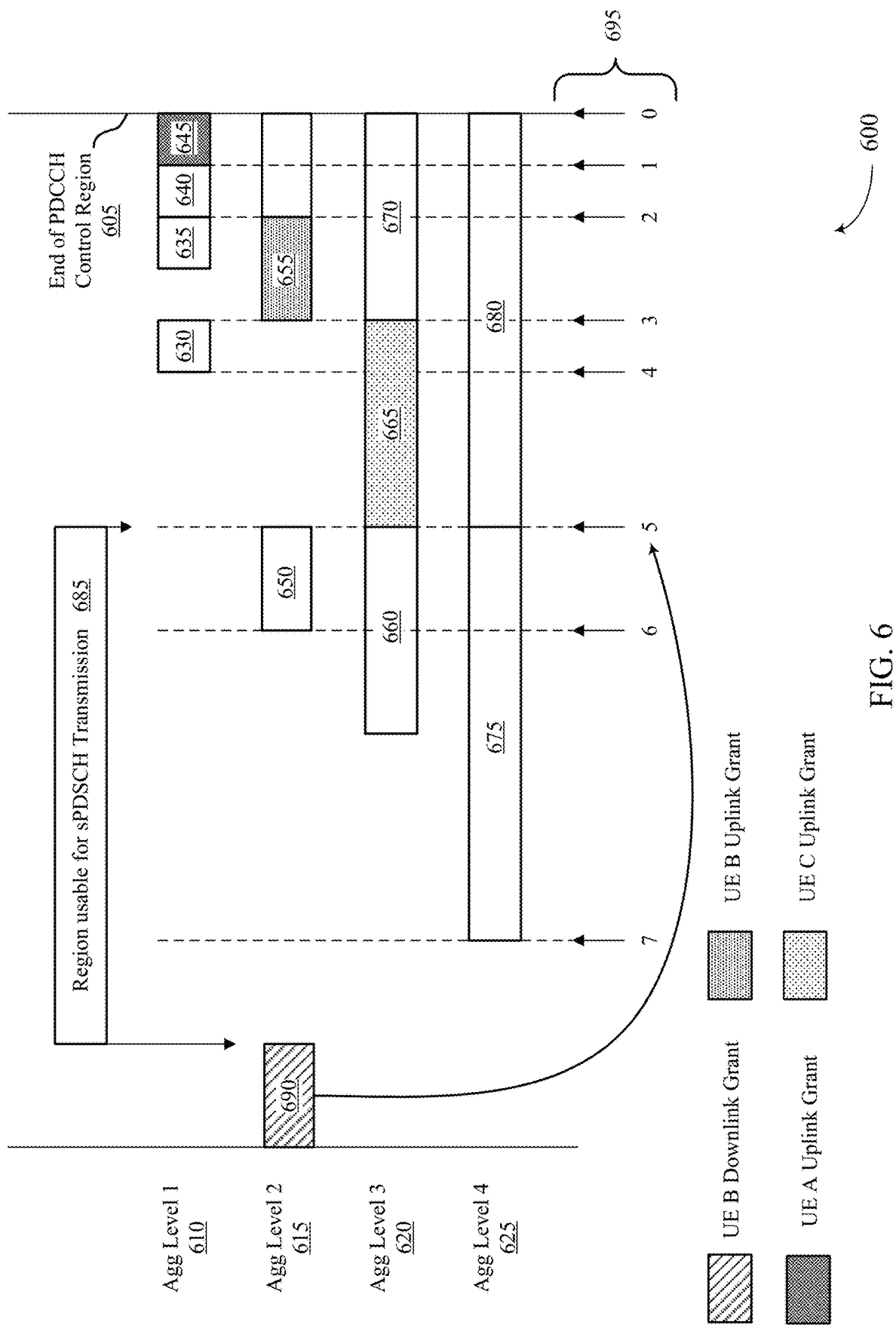
FIG. 6 illustrates an example of an uplink search space that supports downlink control channel structures for low latency communications, in accordance with various aspects of the present disclosure.

FIG. 6 illustrates an example of an uplink search space 600 for downlink control channel structures for low latency communications, in accordance with various aspects of the present disclosure. The sPDCCH uplink search space 600 may represent an uplink search space for an sPDCCH that may be or include one or more aspects of sPDCCH 335, sPDCCH 345, sPDCCH 365, sPDCCH 440, sPDCCH 460, and sPDCCH 515. The uplink search space 600 is shown for four aggregation levels, including a first aggregation level 610, a second aggregation level 615, a third aggregation level 620, and a fourth aggregation level 625. As described above, the uplink grants may be positioned at a boundary 605 (e.g., the end) of an sPDCCH control region. An uplink grant for UE A may be transmitted at first aggregation level 610, an uplink grant for UE B may be transmitted at second aggregation level 615, and an uplink grant for UE C may be transmitted at third aggregation level 620.

As described above, an indication may identify the start of the uplink grant region, which may include uplink grant 645 for UE A, uplink grant 655 for UE B, and uplink grant 645 for UE C. The indication may be a rate matching information field in a downlink grant, for example downlink grant 690 for UE B transmitted at a second aggregation level 615. As illustrated for uplink search space 600, the indication may be three bits to identify one of eight different positions 695. In this example, downlink grant 690 for UE B is transmitted at a second aggregation level 615 and includes an indication of "5" to indicate that the start of the uplink grant region is at "5" position of positions 695. UE B, having received its downlink grant 690, may then understand that the region 685 of the PDCCH control region between the end of the downlink grant 690 for UE B and the "5" position of positions 695.

In other implementations, a greater or fewer number of positions for the start of the uplink grants may be indicated in the downlink grant. A greater number of positions 695 may be indicated by adding one or more bits, for example by increasing the size of the rate matching information field to four or more bits. Increasing the number of positions 695 may increase scheduling flexibility, but may also increase overhead the number of blind decode attempts for a UE receiver to search for uplink grants. Similarly, a smaller number of positions 695 may be indicated (e.g., four positions using two bits in the downlink grant), decreasing flexibility, but also decreasing overhead and the number of blind decode attempts for a UE receiver.

As indicated above, FIG. 6 is provided as an example. Other examples are possible and may differ from what was described in connection with FIG. 6.

Figure 7:
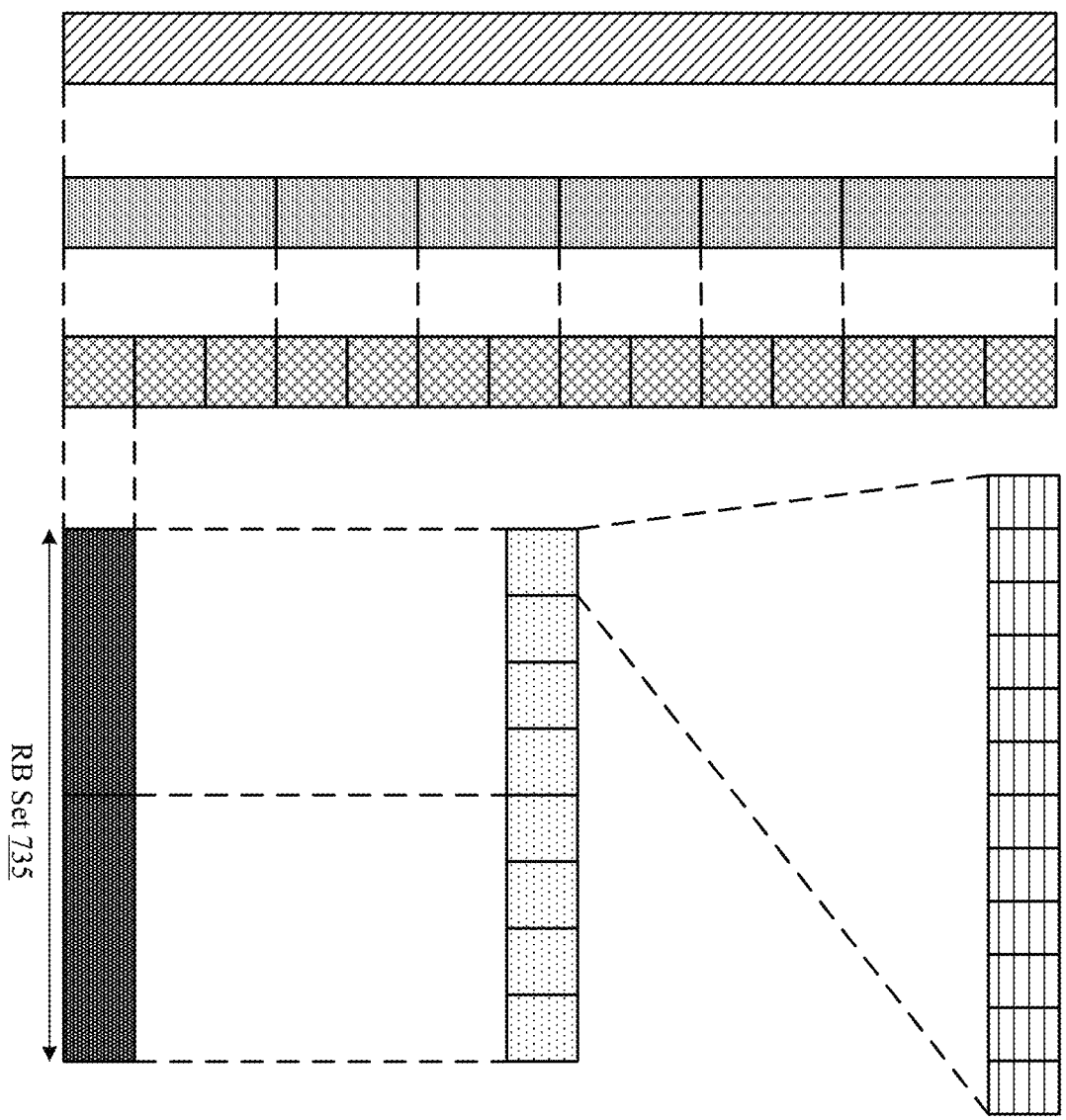
FIGS. 7-12 illustrate examples of resource structures used for low latency communications, in accordance with various aspects of the present disclosure

FIG. 7 illustrates an example resource structure 700 used for low latency communications, in accordance with various aspects of the present disclosure. Resource structure 700 provides an illustration of various groups of resources described herein. Resource structure 700 includes a subframe 705, which may represent a TTI in some wireless communications systems (e.g., LTE systems). Subframe 705 may include multiple sTTIs 710, which may represent a TTI in other wireless communications systems (e.g., low latency systems).

The sTTIs 710 may each include multiple symbols (e.g., two (2) or three (3)) symbols, and each sTTI 710 may be self-contained. That is, each sTTI 710 may include a control region that schedules the transmission of low latency data during the sTTI 710 (e.g., uplink or downlink low latency communications). Further, each sTTI 710 may be associated with an index that indicates a number of resource elements available for a transmission of downlink control information (DCI) in a control region of the sTTI 710. For example, the third sTTI 710 in subframe 705 may be associated with an index of two (2), and a number of resource elements used for other signaling (e.g., CRS transmissions) in the third sTTI 710 may be determined based at least in part on the sTTI index.

The control region of an sTTI 710 may be referred to as an sPDCCH and/or a resource block set, and may be structured to support an efficient use of resources as described herein. As illustrated, a symbol 715 of an sTTI 710 includes multiple (i.e., two (2)) shortened control channel elements (sCCEs) 720 that span a portion of the system bandwidth. An sCCE 720 contains DCI that is used to provide control information for communications during the sTTI 710. A base station 105 may transmit DCI during multiple sCCEs 720 (as shown), where the number of sCCEs 720 used for the transmission of DCI represents the aggregation level used by the base station for the transmission of DCI. In the example of FIG. 7, a base station may utilize an aggregation level of two (2) for control transmissions to a UE 115 during an sTTI 710 (i.e., two sCCEs 720). In other examples, a base station may utilize an aggregation level of one (1) (i.e., one sCCE 720), four (4) (i.e., four sCCEs 720), etc. for control transmissions to a UE 115 during an sTTI 710.

Each sCCE 720 may include a fixed number of sREGs 725 (e.g., four (4)) or may include a variable number of sREGs 725 (not shown). Each sREG 725 may include one (1) resource block, which may include 12 resource elements 730 within a symbol 715. As described above, in some cases, some resource elements 730 within an sREG 725 may be used for other signaling, such as cell-specific reference signal (CRS) signaling, demodulation reference signal (DMRS) signaling, channel state information-reference signal (CSI-RS) signaling, and/or the like.

A resource block set 735 may include one or more sCCEs 720. In some aspects, the number of sCCEs 720 included in a resource block set 735 may be signaled to a UE 115 by a base station 105 using higher layer signaling (e.g., in an RRC connection configuration message). Additionally, or alternatively, such signaling may indicate the mapping of sCCEs 720 to sREGs 725. In some aspects, the mapping may indicate a contiguous (e.g., localized) group of sREGs 725 included in an sCCE 720. In some aspects, the mapping may indicate a non-contiguous (e.g., distributed) group of sREGs 725 included in an sCCE 720. In some aspects, when the resource block set is configured with a DMRS based reference signal demodulation scheme, the mapping may be contiguous. In some aspects, when the resource block set is configured with a CRS based reference signal demodulation scheme, the mapping may be contiguous or non-contiguous.

In some aspects, the UE 115 may be configured with a single resource block set 735 that contains a UE-specific sTTI search space specific to the UE 115. In some aspects, the UE 115 may be configured with multiple resource block sets 735 (e.g., two resource block sets 735, more than two resource block sets 735, etc.) that contain a UE-specific sTTI search space specific to the UE 115.

A resource block set 735 may be self-contained within one resource management block. That is, a resource block set 735 may be embedded within a resource management block during an sTTI, and/or may include control information for the resource management block and the sTTI. In some aspects, a resource block set 735 may include control information for another resource management block other than the resource management block in which the resource block set 735 is embedded, thereby reducing control overhead. Additionally, or alternatively, a resource block set 735 may include control information for another sTTI other than the sTTI during which the resource block set 735 is transmitted or received, thereby further reducing control overhead.

As indicated above, FIG. 7 is provided as an example. Other examples are possible and may differ from what was described in connection with FIG. 7.

Figure 8A:
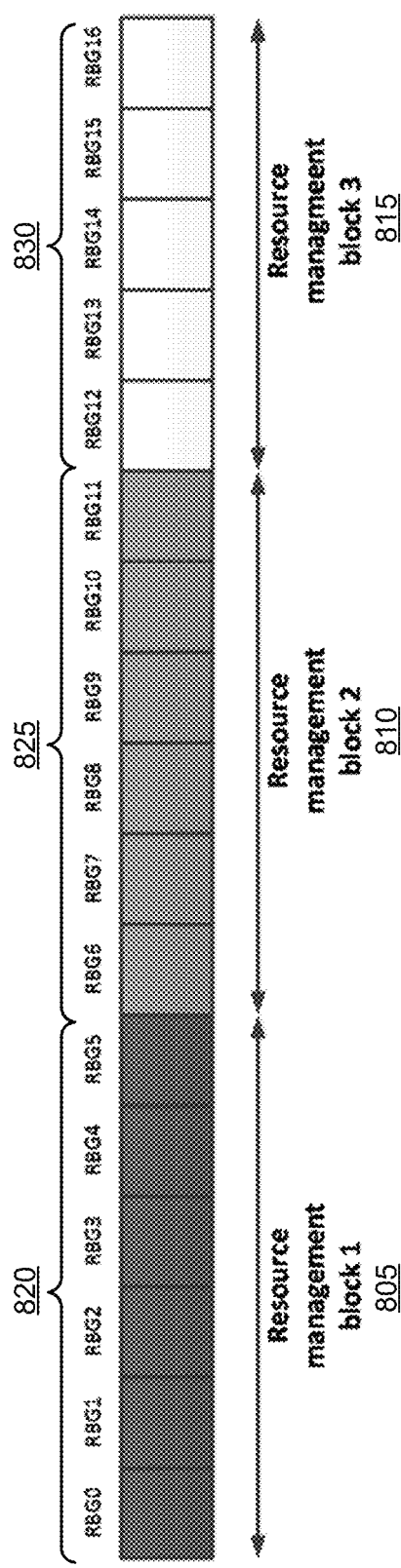
Figure 8B:
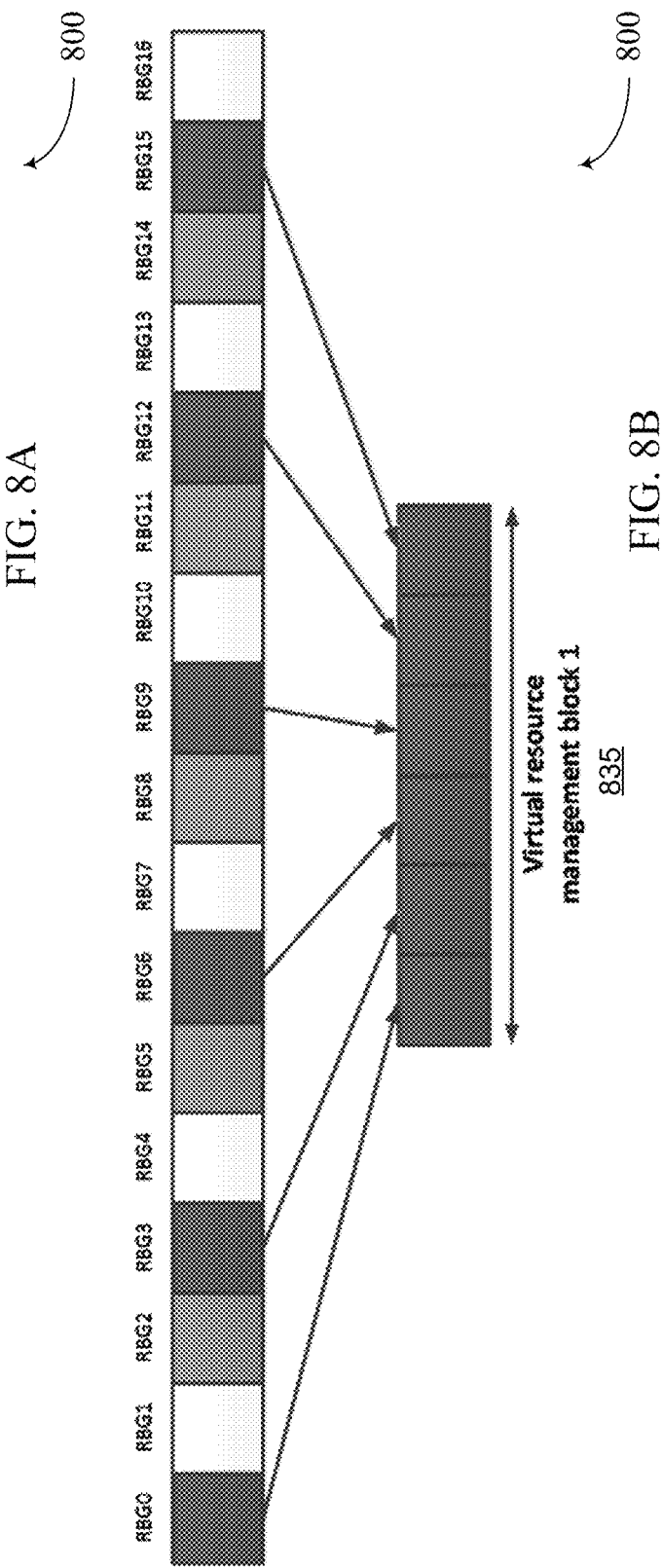

FIGS. 8A and 8B illustrate example resource structures 800 used for low latency communications, in accordance with various aspects of the present disclosure.

As shown in FIG. 8A, in some aspects, a resource management block may include a set of contiguous (e.g., localized) resource block groups (RBGs). As shown in FIG. 8B, in some aspects, a resource management block may include a set of non-contiguous (e.g., distributed) resource block groups. In some aspects, a base station 105 may indicate to a UE 115, in a resource management block configuration, whether a resource management block includes contiguous or non-contiguous resource block groups. In the example resource structures 800, a system bandwidth is 10 MHz, a resource block group includes 3 resource blocks, and the resource block management configuration indicates three resource management blocks, shown as a first resource management block 805, a second resource management block 810, and a third resource management block 815.

As shown in FIG. 8A, the first resource management block 805 may include a first set of RBGs 820, the second resource management block 810 may include a second set of RBGs 825, and the third resource management block 815 may include a third set of RBGs 830. In some aspects, the number of RBGs included in a set of RBGs may be configurable based at least in part on a resource management block configuration. For example, the first set of RBGs 820 is shown as including 6 RBGs (e.g., 18 RBs), the second set of RBGs 825 is shown as including 6 RBGs (e.g., 18 RBs), and the third set of RBGs 830 is shown as including 5 RBGs (e.g., 15 RBs). In some aspects, a resource management block includes at least one resource block set.

As shown in FIG. 8B, a resource management block 835 may be referred to as a virtual resource management block when the resource management block 835 includes a set of non-contiguous RBGs. The resource management blocks shown in FIGS. 8A and 8B may be downlink resource management blocks or uplink resource management blocks, and may be defined by higher layer signaling (e.g., during an RRC connection procedure). In some aspects, a resource management block may be cell-specific. In this way, the resource management block configuration may be shared across UEs 115 located in a cell, thereby reducing signaling and conserving network resources.

As indicated above, FIGS. 8A and 8B are provided as examples. Other examples are possible and may differ from what was described in connection with FIGS. 8A and 8B.

Figure 9:
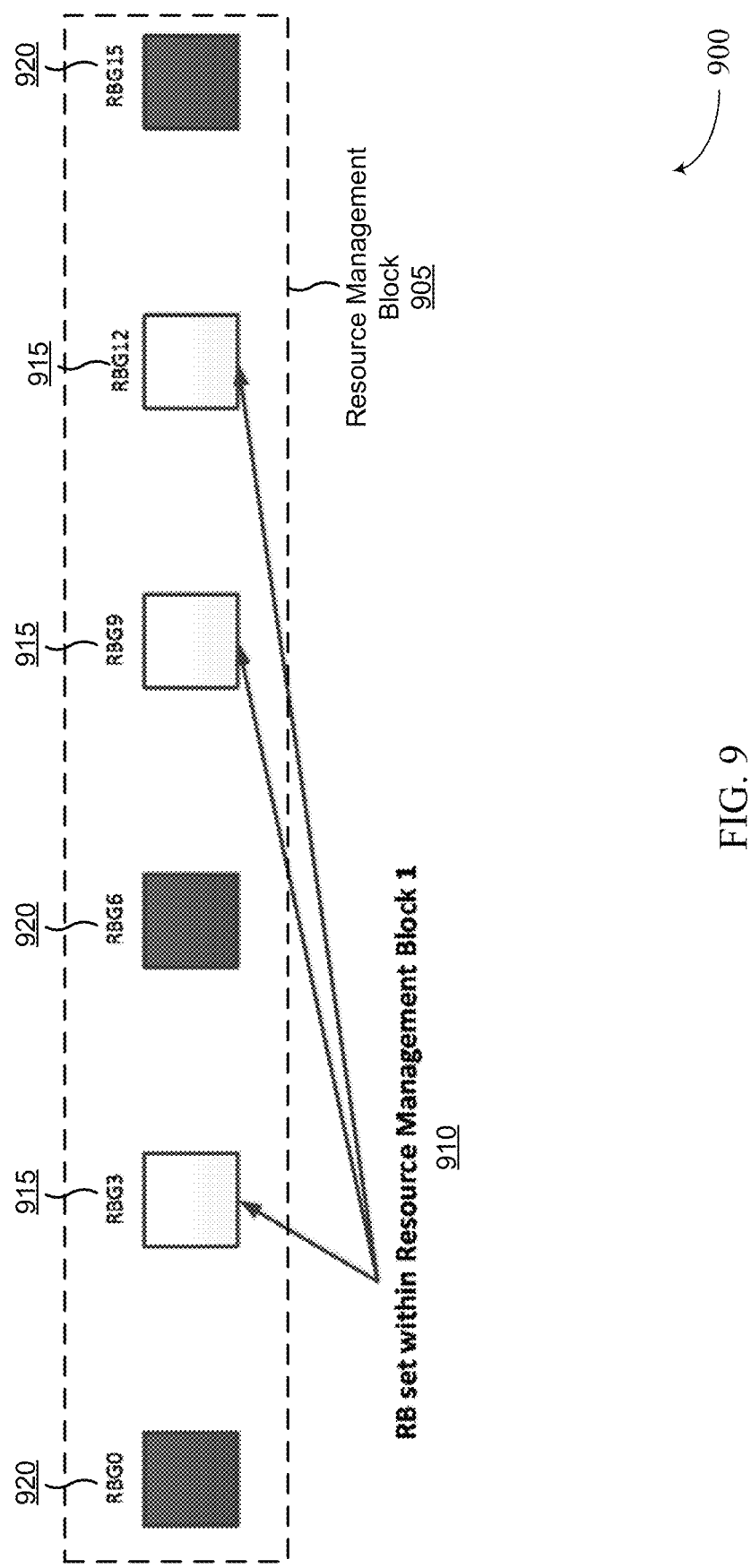

FIG. 9 illustrates an example resource structure 900 used for low latency communications, in accordance with various aspects of the present disclosure. As shown in FIG. 9, a resource management block 905 may include at least one RB set 910. The resource management block 905 shown in FIG. 9 corresponds to the virtual resource management block 835 shown in FIG. 8B. However, in some aspects, the resource management block 905 may correspond to one or more of the resource blocks shown in FIG. 8A.

In some aspects, the RB set 910 may be a subset of the resource management block 905. In this way, the control region (e.g., sPDCCH) of resource management block 905 may be self-contained within resource management block 905. For example, the RB set 910 may include a subset of the RBGs included in the resource management block 905, shown as RBGs 915. In some aspects, one or more RBGs of the resource management block 905 may not be included in the RB set 910, shown as RBGs 920. In some aspects, one or more RBGs 920 may be used for a data region of the resource management block 905 and/or may be used for another RB set of the resource management block 905. In some aspects, ratematching may be performed to determine the sCCEs (and/or corresponding RBGs, REGs, etc.) used for control information in the RB set 910, and sCCEs (and/or corresponding RBGs, REGs, etc.) not used for control information may be reallocated to a data region (e.g., an sPDSCH), as described elsewhere herein.

In some aspects, the RB set is cell-specific. Additionally, or alternatively, a number of symbols used for the RB set may be cell-specific. In this way, the resource management block configuration (e.g., a configuration of an RB set) may be shared across UEs 115 located in a cell, thereby reducing signaling and conserving network resources.

In some aspects, the RB set is configured with a DMRS based reference signal demodulation scheme. In some aspects, the RB set is configured with a CRS based reference signal demodulation scheme. In some aspects, RB sets configured with different types of reference signal demodulation schemes may be different. For example, a first RB set that is configured with a first reference signal demodulation scheme may at least partially overlap (e.g., may partially overlap or completely overlap) a second RB set that is configured with a second reference signal demodulation scheme. In some aspects, a first RB set that is configured with a first reference signal demodulation scheme may not overlap with a second RB set that is configured with a second reference signal demodulation scheme. In some aspects, an RB set configured with a DMRS based reference signal demodulation scheme may be a contiguous (e.g., localized) set of REGs. In some aspects, an RB set configured with a CRS based reference signal demodulation scheme may be a non-contiguous (e.g., distributed) set of REGs. In some aspects, all CRS based sPDCCHs in a resource management block may have an identical RB set. In some aspects, all DMRS based sPDCCHs in a resource management block may have an identical RB set.

In some aspects, CRS communications may be disabled in subframes configured for multicast broadcast single frequency communication, and demodulation of a control region and a data region in these subframes may be based at least in part on a DMRS based reference signal demodulation scheme. In this way, control overhead may be reduced.

As indicated above, FIG. 9 is provided as an example. Other examples are possible and may differ from what was described in connection with FIG. 9.

Figure 10:
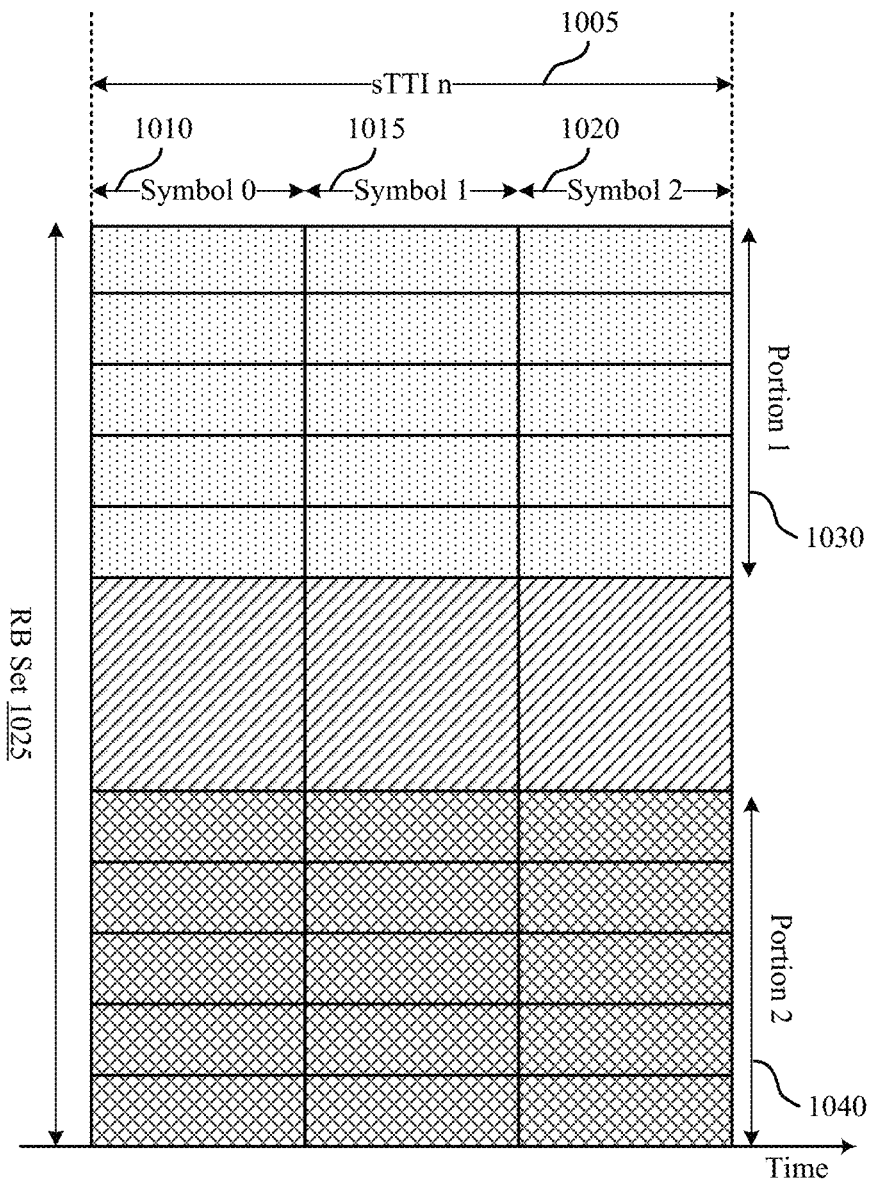

FIG. 10 illustrates an example resource structure 1000 used for low latency communications, in accordance with various aspects of the present disclosure. As shown in FIG. 10, in some aspects, an sTTI 1005 may include three symbols, shown as a first symbol 1010, a second symbol 1015, and a third symbol 1020. In this case, information received in the third symbol 1020 may be demodulated according to a demodulation rule, which may be indicated in a resource management block configuration. As further shown, an RB set 1025 may include a first portion 1030 that includes downlink control information 1035, a second portion 1040 that includes uplink control information 1045, and a reallocated sPDSCH portion 1050, as described above in connection with RB set 550 of FIGS. 5A and 5B. In example resource structure 1000, each of the first portion 1030, the second portion 1040, and the reallocated sPDSCH portion 1050 occupy the three symbols of the sTTI 1005.

In the example of FIG. 10, a control region of the RB set 1025 may be configured with a DMRS based reference signal demodulation scheme or a CRS based reference signal demodulation scheme, and a data region of the sTTI 1005 may be configured with a DMRS based reference signal demodulation scheme. In this case, one or more DMRS signals from the first two symbols (e.g., the first symbol 1010 and/or the second symbol 1015) may be used to demodulate data in the third symbol 1020 and/or the data region of the sTTI 1005 (e.g., as indicated by a demodulation rule). By frequency division multiplexing the first portion 1030, the second portion 1040, and the reallocated sPDSCH 1050, complexity may be reduced.

As indicated above, FIG. 10 is provided as an example. Other examples are possible and may differ from what was described in connection with FIG. 10.

Figure 11:
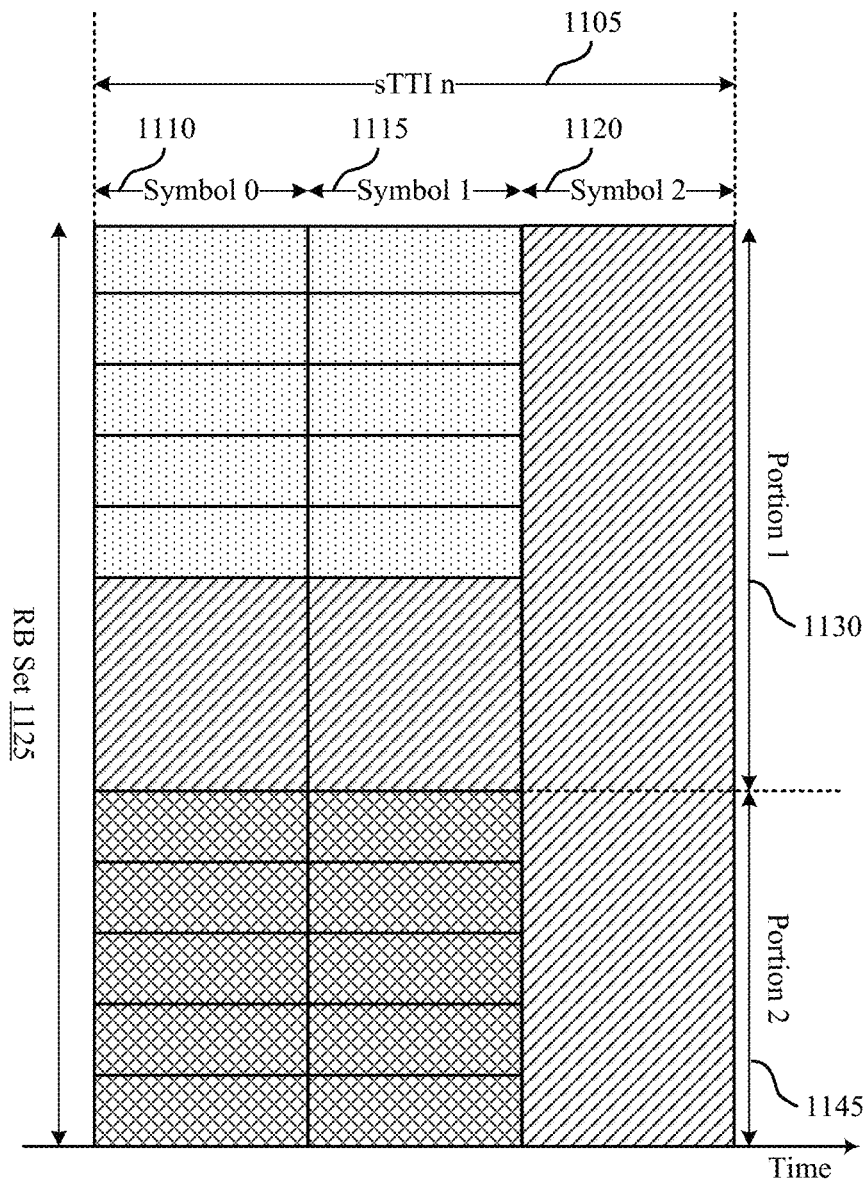

FIG. 11 illustrates an example resource structure 1100 used for low latency communications, in accordance with various aspects of the present disclosure. As shown in FIG. 11, in some aspects, an sTTI 1105 may include three symbols, shown as a first symbol 1110, a second symbol 1115, and a third symbol 1120. In this case, information received in the third symbol 1120 may be demodulated according to a demodulation rule, which may be indicated in a resource management block configuration. As further shown, an RB set 1125 may include a first portion 1130 that includes downlink control information 1135 and a reallocated sPDSCH portion 1140 (e.g., in the first symbol 1110, the second symbol 1115, and the third symbol 1120), a second portion 1145 that includes uplink control information 1150 and a reallocated sPDSCH portion 1140 (e.g., in the third symbol 1120). In example resource structure 1100, each of the first portion 1130 and the second portion 1145 occupy the three symbols of the sTTI 1105.

In the example of FIG. 11, a control region of the RB set 1125 may be configured with a DMRS based reference signal demodulation scheme, and a data region of the sTTI 1105 may be configured with a DMRS based reference signal demodulation scheme. In this case, one or more CRS signals from the first two symbols (e.g., the first symbol 1110 and/or the second symbol 1115) may be used to demodulate the third symbol 1120 and/or a data region of the sTTI 1105 (e.g., as indicated by a demodulation rule). Alternatively, a DMRS signal from a previous sTTI 1105 may be used to demodulate data in the third symbol 1120 and/or the data region (e.g., using open-loop precoding).

As indicated above, FIG. 11 is provided as an example. Other examples are possible and may differ from what was described in connection with FIG. 11.

Figure 12:
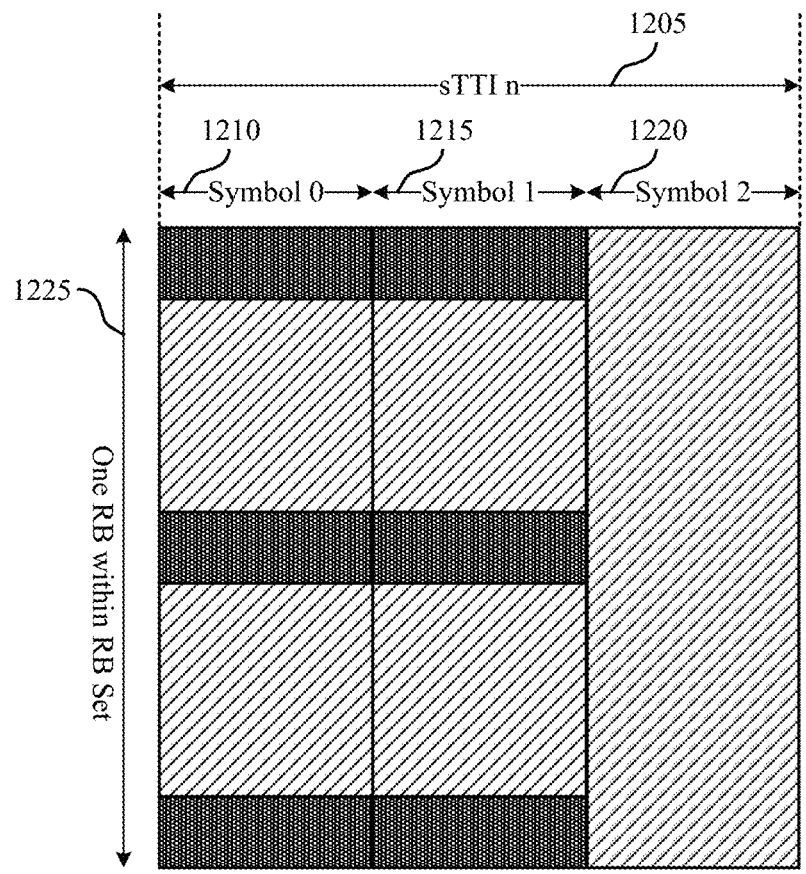

FIG. 12 illustrates an example resource structure 1200 used for low latency communications, in accordance with various aspects of the present disclosure. As shown in FIG. 12, in some aspects, an sTTI 1205 may include three symbols, shown as a first symbol 1210, a second symbol 1215, and a third symbol 1220. In this case, information received in the third symbol 1220 may be demodulated according to a demodulation rule, which may be indicated in a resource management block configuration. As further shown, an RB 1225 within an RB set may be allocated in the sTTI 1205.

In the example of FIG. 12, a control region of the RB set may be configured with a CRS based reference signal demodulation scheme, and a data region of the sTTI 1205 may be configured with a DMRS based reference signal demodulation scheme. In this case, a UE may use blind decoding to identify a DRMS signal to be used to demodulate the third symbol 1220 and/or data in a data region of the sTTI.

As indicated above, FIG. 11 is provided as an example. Other examples are possible and may differ from what was described in connection with FIG. 11.

Figure 13:
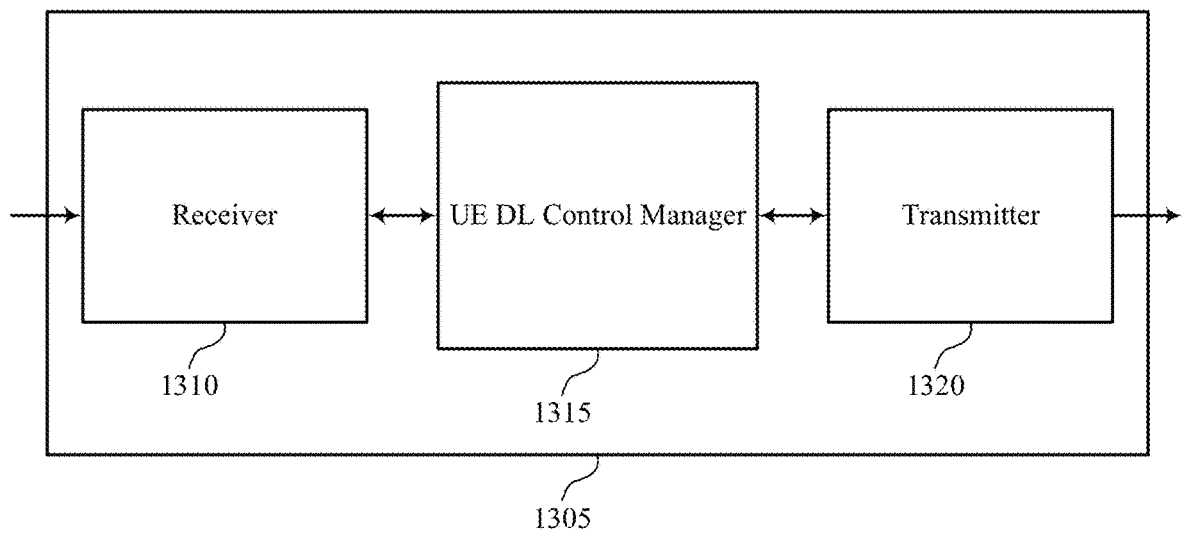
FIGS. 13 and 14 illustrate block diagrams of a device that supports downlink control channel structures for low latency communications, in accordance with various aspects of the present disclosure.

FIG. 13 shows a block diagram 1300 of a wireless device 1305 that supports downlink control channel structures for low latency communications, in accordance with various aspects of the present disclosure. Wireless device 1305 may be an example of aspects of a user equipment (UE) 115 as described with reference to FIG. 1. Wireless device 1305 may include receiver 1310, UE downlink (DL) control manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to downlink control channel structure for low latency communications, etc.). Information may be passed on to other components of the wireless device 1305. The receiver 1310 may be an example of aspects of the transceiver 1535 described with reference to FIG. 15.

UE DL control manager 1315 may be an example of aspects of the UE DL control manager 1515 described with reference to FIG. 15.

UE DL control manager 1315 may identify a resource management block based at least in part on a resource management block configuration indicated by a base station, wherein the resource management block spans a portion of a system bandwidth in an sTTI. UE DL control manager 1315 may identify a resource block set that is a self-contained subset of the resource management block, wherein the resource block set includes a control region with control information for the UE for the sTTI. UE DL control manager 1315 may use the control information to locate content, intended for the wireless device 1305, at least partially within a data region of the sTTI.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

As indicated above, FIG. 13 is provided as an example. Other examples are possible and may differ from what was described in connection with FIG. 13.

Figure 14:
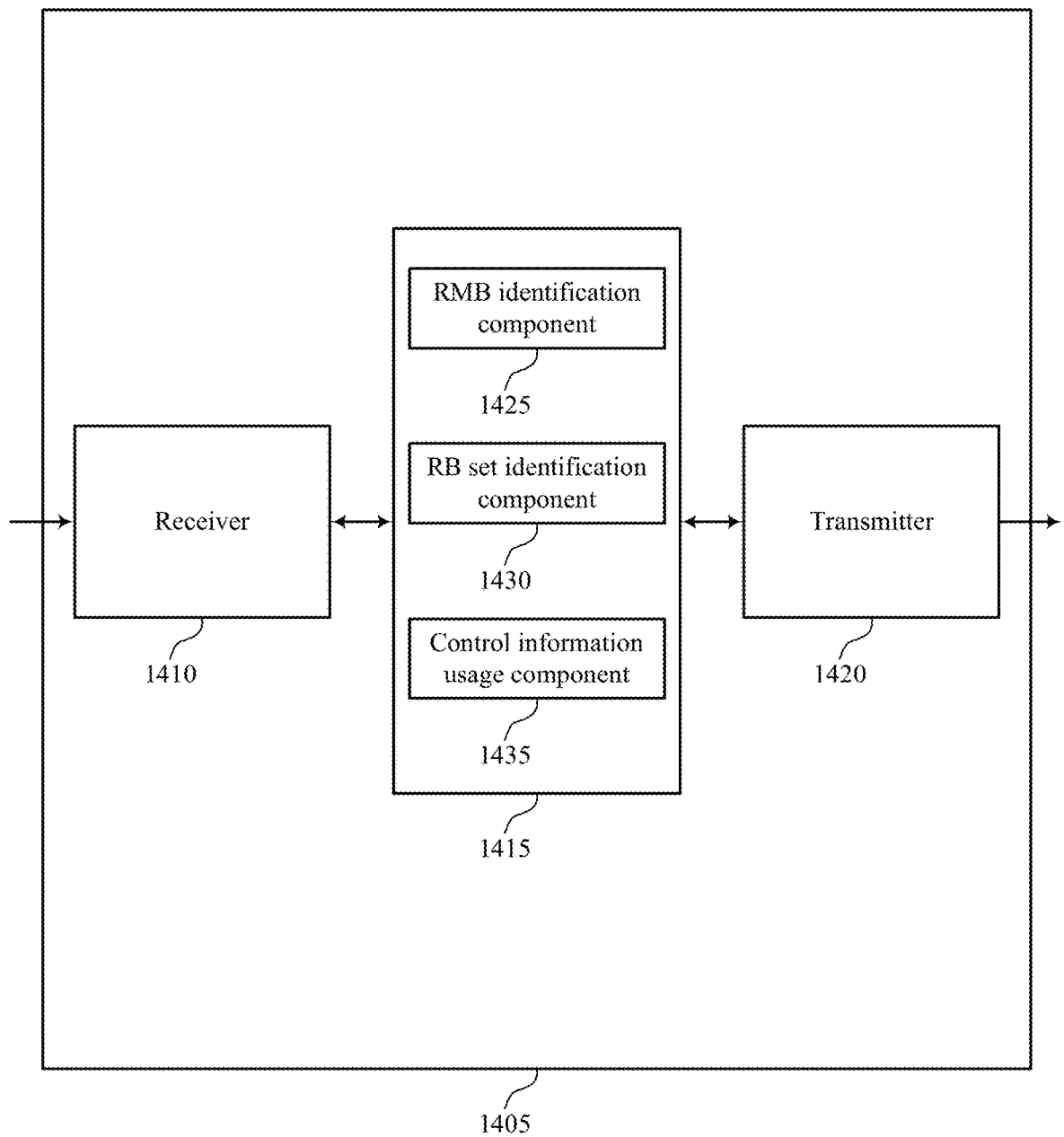

FIG. 14 shows a block diagram 1400 of a wireless device 1405 that supports downlink control channel structures for low latency communications, in accordance with various aspects of the present disclosure. Wireless device 1405 may be an example of aspects of a wireless device 1305 or a UE 115 as described with reference to FIGS. 1 and 13. Wireless device 1405 may include receiver 1410, UE DL control manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to downlink control channel structure for low latency communications, etc.). Information may be passed on to other components of the device. The receiver 1410 may be an example of aspects of the transceiver 1535 described with reference to FIG. 15.

UE DL control manager 1415 may be an example of aspects of the UE DL control manager 1515 described with reference to FIG. 15. UE DL control manager 1415 may also include resource management block (RMB) identification component 1425, RB set identification component 1430, and control information usage component 1435. RMB identification component 1425 may identify a resource management block based at least in part on a resource management block configuration indicated by a base station, wherein the resource management block spans a portion of a system bandwidth in an sTTI. RB set identification componenet 1430 may identify a resource block set that is a self-contained subset of the resource management block, wherein the resource block set includes a control region with control information for the UE for the sTTI. Control information usage component 1435 may use the control information to locate content, intended for the wireless device 1405, at least partially within a data region of the sTTI.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1535 described with reference to FIG. 15. The transmitter 1420 may include a single antenna, or it may include a set of antennas.

As indicated above, FIG. 14 is provided as an example. Other examples are possible and may differ from what was described in connection with FIG. 14.

Figure 15:
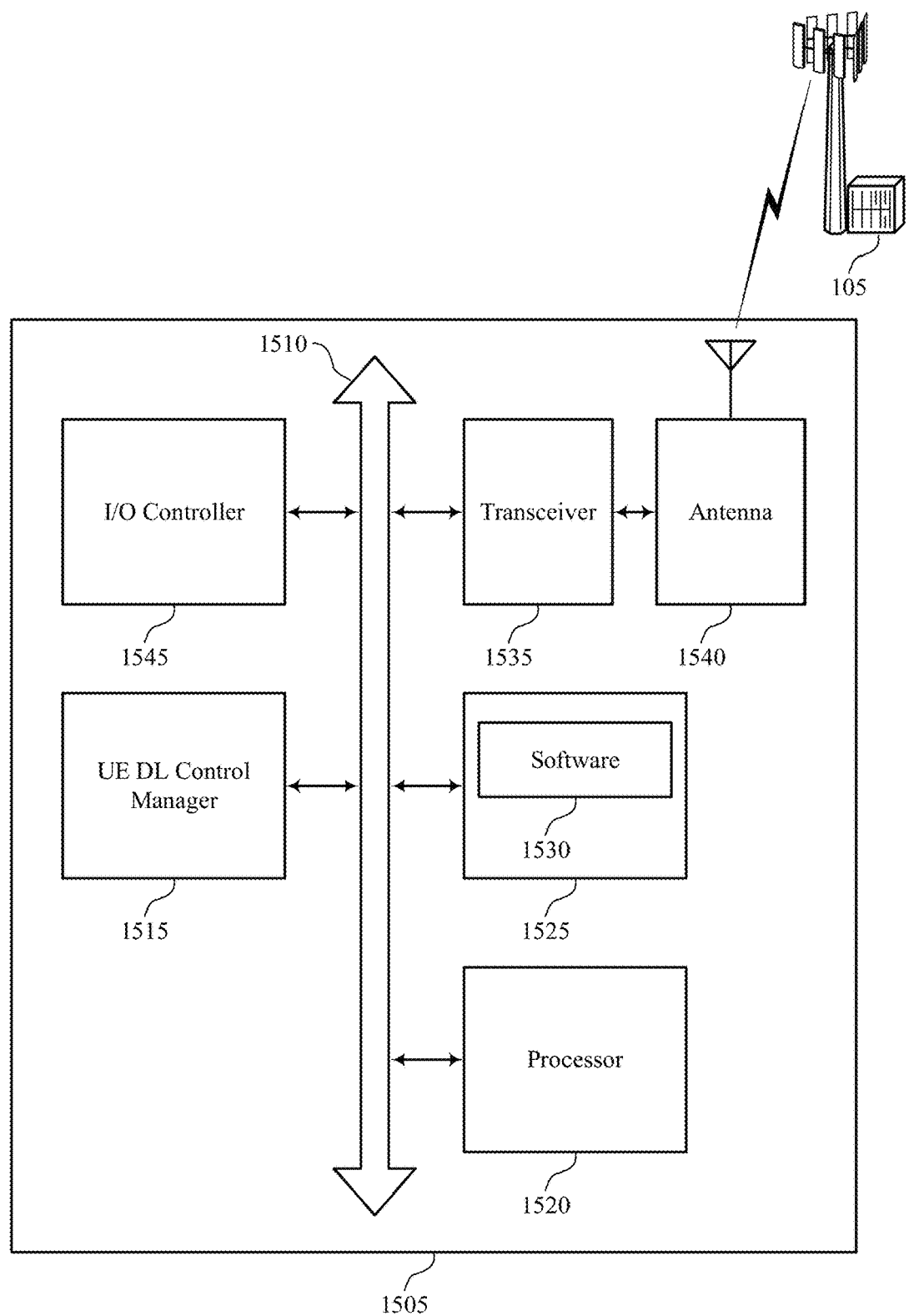
FIG. 15 illustrates a block diagram of a system including a UE that supports downlink control channel structures for low latency communications, in accordance with various aspects of the present disclosure.

FIG. 15 shows a diagram of a system 1500 including a device 1505 that supports downlink control channel structures for low latency communications, in accordance with various aspects of the present disclosure. Device 1505 may be an example of or include the components of wireless device 1305, wireless device 1405, or a UE 115 as described above, e.g., with reference to FIGS. 1, 13 and 14. Device 1505 may include components for bi-directional voice and data communications including components for transmitting and receiving communications, including UE DL control manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting downlink control channel structure for low latency communications).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware and/or software operation such as the interaction with peripheral components or devices.

Software 1530 may include code to implement aspects of the present disclosure, including code to support downlink control channel structure for low latency communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

As indicated above, FIG. 15 is provided as an example. Other examples are possible and may differ from what was described in connection with FIG. 15.

Figure 16:
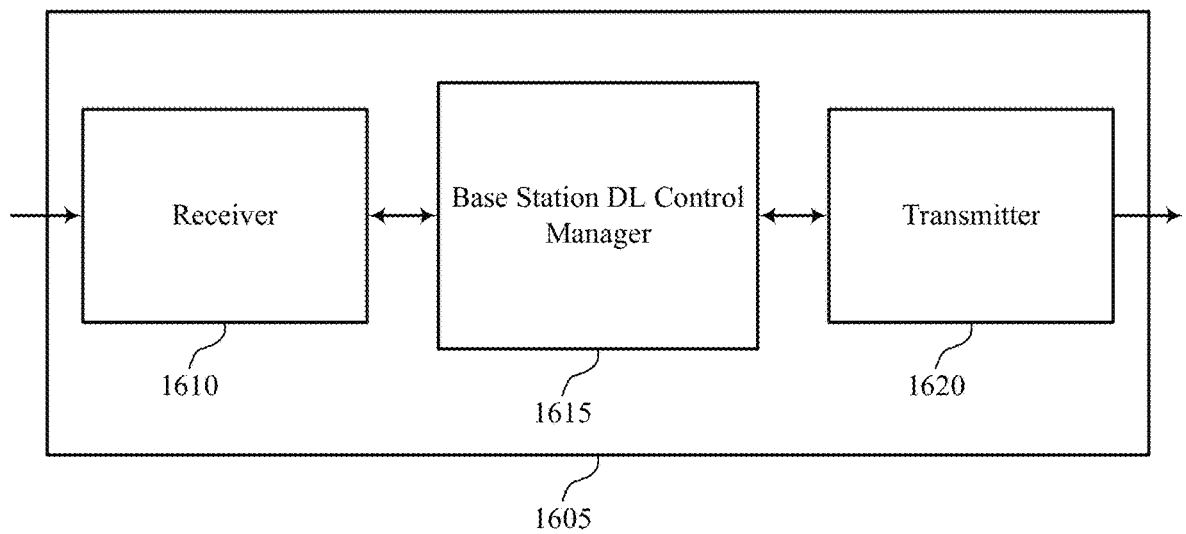
FIG. 16 illustrates a block diagram of a device that supports downlink control channel structures for low latency communications, in accordance with various aspects of the present disclosure.

FIG. 16 shows a block diagram 1600 of a wireless device 1605 that supports downlink control channel structures for low latency communications, in accordance with various aspects of the present disclosure. Wireless device 1605 may be an example of aspects of a base station 105 as described with reference to FIG. 1. Wireless device 1605 may include receiver 1610, base station DL control manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to downlink control channel structure for low latency communications, etc.). Information may be passed on to other components of the device. The receiver 1610 may be an example of aspects of the transceiver 1735 described with reference to FIG. 17.

Base station DL control manager 1615 may be an example of aspects of the base station DL control manager 1715 described with reference to FIG. 17.

Base station DL control manager 1615 may indicate a resource management block configuration that identifies a plurality of resource management blocks that span at least a portion of system bandwidth and are allocated in an sTTI.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1735 described with reference to FIG. 17. The transmitter 1620 may include a single antenna, or it may include a set of antennas. In some aspects, transmitter 1620 may transmit control information for the sTTI in a resource block set that is a self-contained subset of a resource management block of the plurality of resource management blocks.

As indicated above, FIG. 16 is provided as an example. Other examples are possible and may differ from what was described in connection with FIG. 16.

Figure 17:
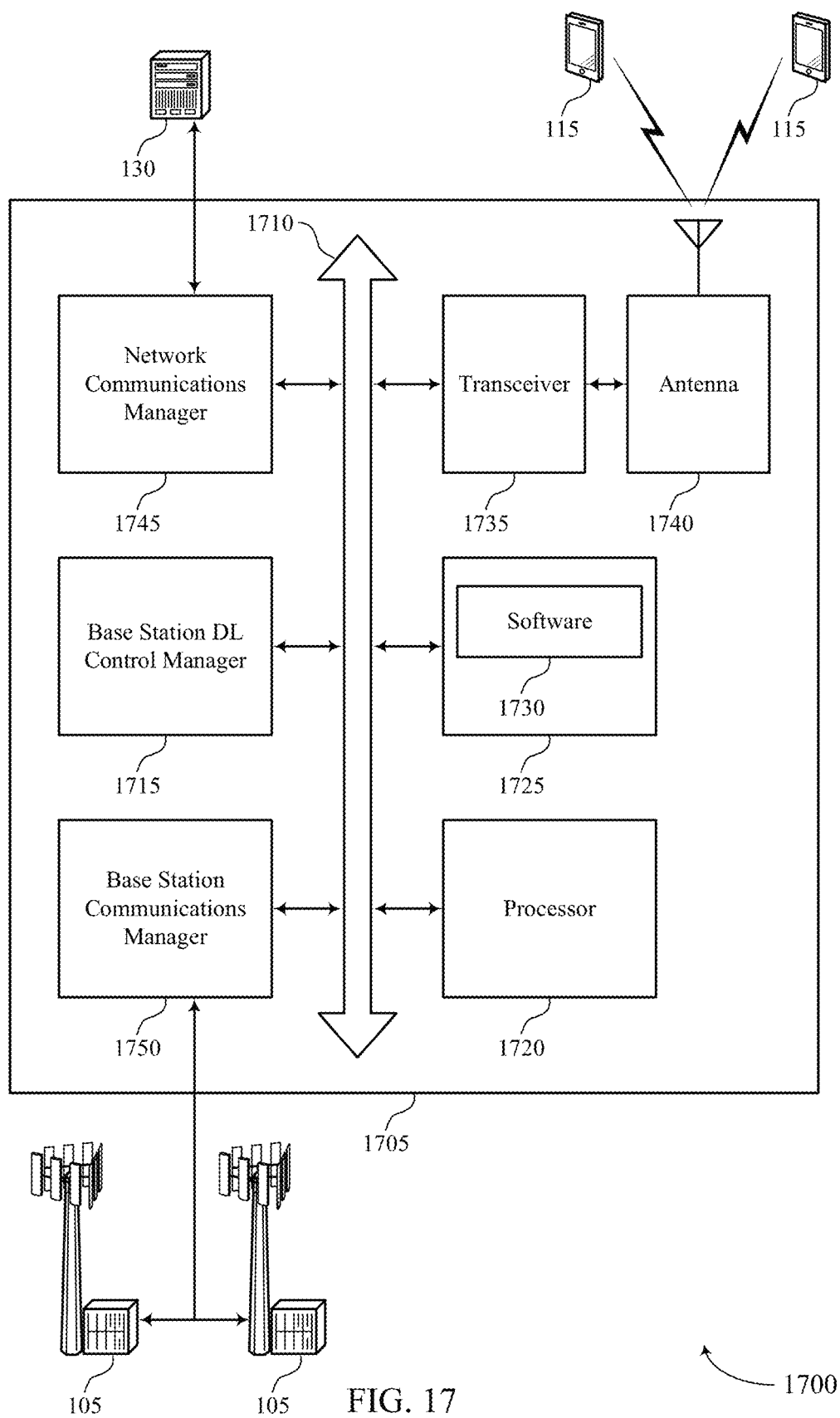
FIG. 17 illustrates a block diagram of a system including a base station that supports downlink control channel structures for low latency communications, in accordance with various aspects of the present disclosure.

FIG. 17 shows a diagram of a system 1700 including a device 1705 that supports downlink control channel structures for low latency communications, in accordance with various aspects of the present disclosure. Device 1705 may be an example of or include the components of base station 105 as described above, e.g., with reference to FIG. 1. Device 1705 may include components for bi-directional voice and data communications including components for transmitting and receiving communications, including base station DL control manager 1715, processor 1720, memory 1725, software 1730, transceiver 1735, antenna 1740, network communications manager 1745, and base station communications manager 1750. These components may be in electronic communication via one or more busses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting downlink control channel structure for low latency communications). 1420.

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support downlink control channel structure for low latency communications. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Base station communications manager 1750 may manage communications with other base station 105, and may include a controller or scheduler for controlling communications with UEs 115 in cooperation with other base stations 105. For example, the base station communications manager 1750 may coordinate scheduling for transmissions to UEs 115 for various interference mitigation techniques such as beamforming or joint transmission. In some examples, base station communications manager 1750 may provide an X2 interface within an Long Term Evolution (LTE)/LTE-A wireless communication network technology to provide communication between base stations 105.

As indicated above, FIG. 17 is provided as an example. Other examples are possible and may differ from what was described in connection with FIG. 17.

Figure 18:
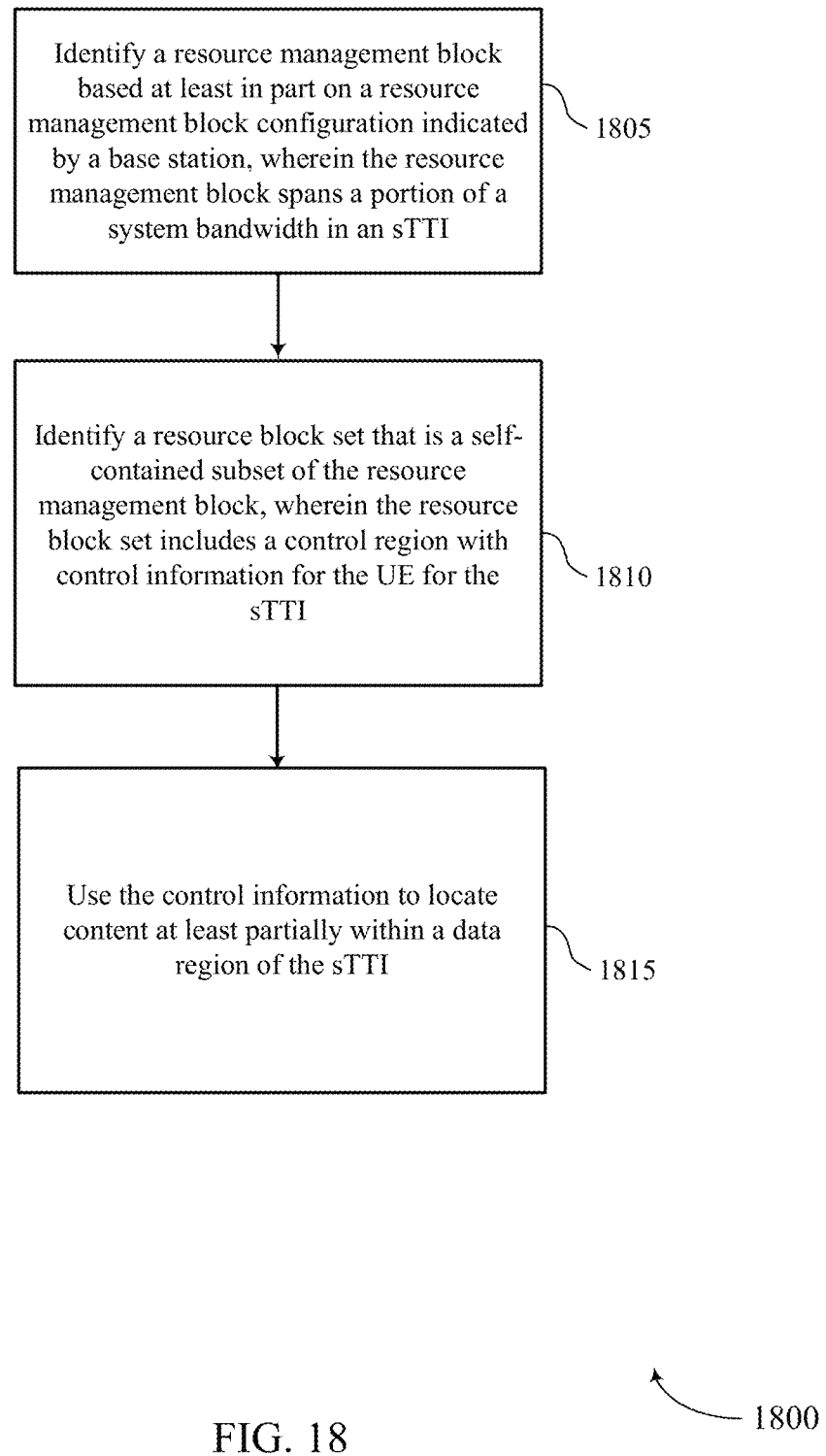
FIGS. 18-20 illustrate methods for downlink control channel structures for low latency communications, in accordance with various aspects of the present disclosure.

FIG. 18 shows a flowchart illustrating a method 1800 for downlink control channel structures for low latency communications, in accordance with various aspects of the present disclosure. The operations of method 1800 may be implemented by a UE 115 or its components as described herein. For example, the operations of method 1800 may be performed by a UE DL control manager as described with reference to FIGS. 13 through 15. In some examples, a UE 115 may execute a set of codes to control the functional elements of the UE 115 to perform the functions described below. Additionally or alternatively, the UE 115 may perform aspects the functions described below using special-purpose hardware.

At block 1805, the UE 115 may identify a resource management block based at least in part on a resource management block configuration indicated by a base station, wherein the resource management block spans a portion of a system bandwidth in an sTTI. The operations of block 1805 may be performed according to the methods described with reference to FIGS. 1 through 12. In certain examples, aspects of the operations of block 1805 may be performed by one or more components as described with reference to FIGS. 13 through 15. In some aspects, the resource management block includes a set of contiguous resource block groups. In some aspects, the resource management block includes a set of non-contiguous resource block groups.

At block 1810, the UE 115 may identify a resource block set that is a self-contained subset of the resource management block, wherein the resource block set includes a control region with control information for the UE for the sTTI. The operations of block 1810 may be performed according to the methods described with reference to FIGS. 1 through 12. In certain examples, aspects of the operations of block 1810 may be performed by one or more components as described with reference to FIGS. 13 through 15. In some aspects, the resource block set is a set of contiguous resource element groups. In some aspects, the resource block set is a set of non-contiguous resource element groups.

In some aspects, the resource block set is cell-specific and a number of symbols used for the resource block set is cell-specific. In some aspects, the resource block set is configured with a demodulation reference signal (DMRS) based reference signal demodulation scheme or a cell-specific reference signal (CRS) based reference signal demodulation scheme. In some aspects, the resource block set at least partially overlaps with another resource block set that uses a different reference signal demodulation scheme than the resource block set. In some aspects, the resource block set does not overlap with another resource block set that uses a different reference signal demodulation scheme than the resource block set.

At block 1815, the UE 115 may use the control information to locate content, intended for the UE 115, at least partially within a data region of the sTTI. The operations of block 1815 may be performed according to the methods described with reference to FIGS. 1 through 12. In certain examples, aspects of the operations of block 1815 may be performed by one or more components as described with reference to FIGS. 13 through 15.

Process 1800 may include additional aspects, such as any single aspect or any combination of aspects described below and/or in connection with one or more other processes described herein.

In some aspects, cell-specific reference signal (CRS) communications are disabled in subframes configured for multicast broadcast single frequency communication, and demodulation of a control region and a data region in these subframes is based at least in part on a demodulation reference signal (DMRS) based reference signal demodulation scheme.

In some aspects, the control region of the resource block set is configured with a demodulation reference signal (DMRS) based reference signal demodulation scheme or a cell-specific reference signal (CRS) based reference signal demodulation scheme, the sTTI includes three symbols and the data region is configured with a DMRS based reference signal demodulation scheme, and one or more DMRS signals from the first two symbols are used to demodulate data in the data region.

In some aspects, the control region of the resource block set and the data region of the sTTI are configured with a demodulation reference signal (DMRS) based reference signal demodulation scheme, the sTTI includes three symbols, and one or more cell-specific reference signals from the first two symbols are used to demodulate data in the data region.

In some aspects, the control region of the resource block set and the data region of the sTTI are configured with a demodulation reference signal (DMRS) based reference signal demodulation scheme, the sTTI includes three symbols, and a DMRS signal in a previous sTTI is used to demodulate data in the data region using open-loop precoding.

In some aspects, the control region of the resource block set is configured with a cell-specific reference signal (CRS) based reference signal demodulation scheme, the sTTI includes three symbols and the data region is configured with a demodulation reference signal (DMRS) based reference signal demodulation scheme, and blind decoding is used to identify a DMRS signal to be used to demodulate data in the data region.

Although FIG. 18 shows example blocks of method 1800, in some implementations, method 1800 may include additional blocks, fewer blocks, different blocks, or differently arranged blocks than those depicted in FIG. 18. Additionally, or alternatively, two or more of the blocks of method 1800 may be performed in parallel.

Figure 19:
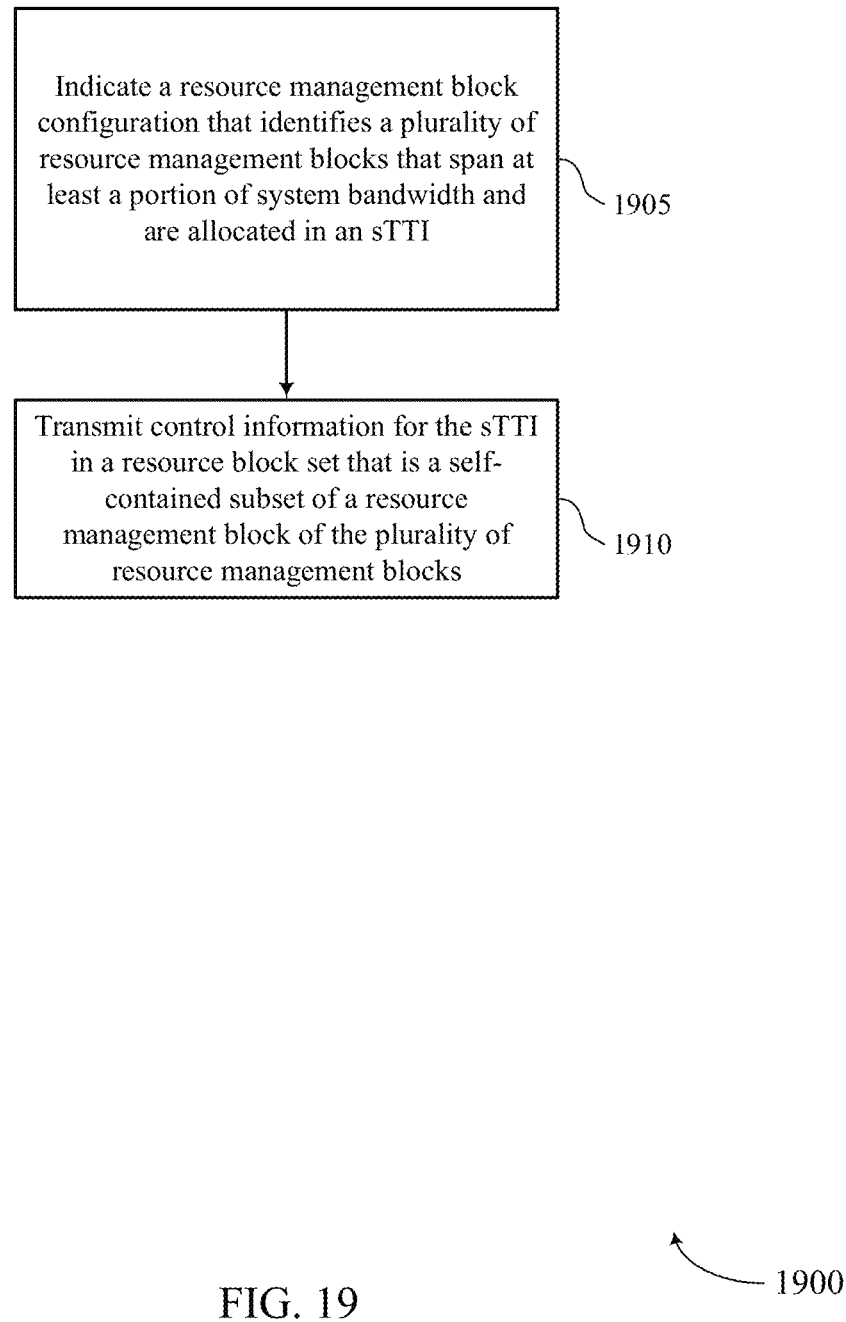

FIG. 19 shows a flowchart illustrating a method 1900 for downlink control channel structures for low latency communications, in accordance with various aspects of the present disclosure. The operations of method 1900 may be implemented by a base station 105 or its components as described herein. For example, the operations of method 1900 may be performed by a base station DL control manager as described with reference to FIGS. 16 and 17. In some examples, a base station 105 may execute a set of codes to control the functional elements of the base station 105 to perform the functions described below. Additionally or alternatively, the base station 105 may perform aspects the functions described below using special-purpose hardware.

At block 1905, the base station 105 may indicate a resource management block configuration that identifies a plurality of resource management blocks that span at least a portion of system bandwidth and are allocated in an sTTI. The operations of block 1905 may be performed according to the methods described with reference to FIGS. 1 through 12. In certain examples, aspects of the operations of block 1905 may be performed by one or more components as described with reference to FIGS. 16 and 17.

At block 1910, the base station 105 may transmit control information for the sTTI in a resource block set that is a self-contained subset of a resource management block of the plurality of resource management blocks. The operations of block 1910 may be performed according to the methods described with reference to FIGS. 1 through 12. In certain examples, aspects of the operations of block 1910 may be performed by one or more components as described with reference to FIGS. 16 and 17.

Process 1900 may include additional aspects, such as any single aspect or any combination of aspects described in connection with one or more other processes described herein.

Although FIG. 19 shows example blocks of method 1900, in some implementations, method 1900 may include additional blocks, fewer blocks, different blocks, or differently arranged blocks than those depicted in FIG. 19. Additionally, or alternatively, two or more of the blocks of method 1900 may be performed in parallel.

Figure 20:
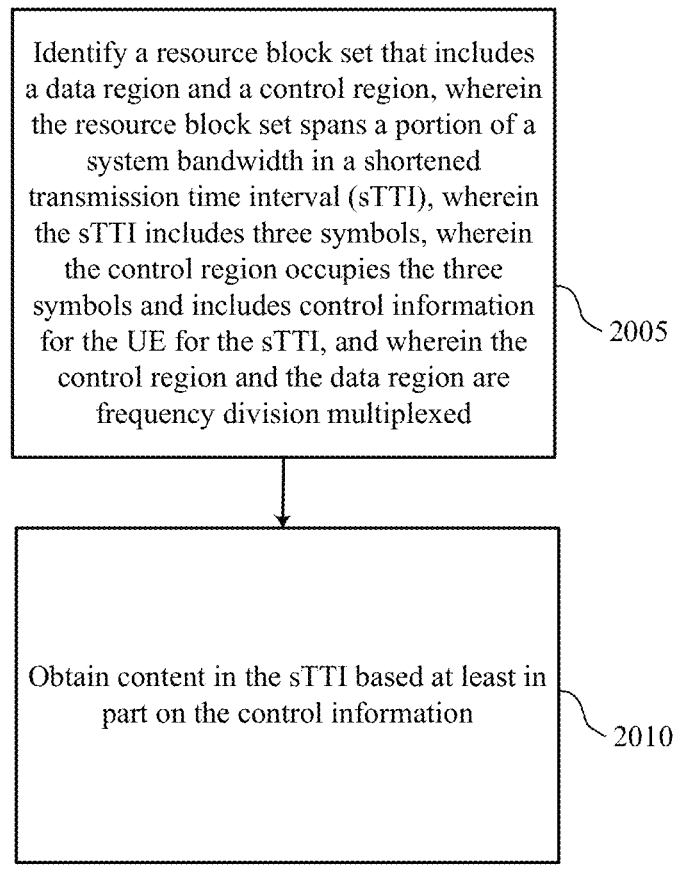

FIG. 20 shows a flowchart illustrating a method 2000 for downlink control channel structures for low latency communications, in accordance with various aspects of the present disclosure. The operations of method 2000 may be implemented by a UE 115 or its components as described herein. For example, the operations of method 2000 may be performed by a UE DL control manager as described with reference to FIGS. 13 through 15. In some examples, a UE 115 may execute a set of codes to control the functional elements of the UE 115 to perform the functions described below. Additionally or alternatively, the UE 115 may perform the functions described below using special-purpose hardware.

At block 2005, the UE 115 may identify a resource block set that includes a data region and a control region, wherein the resource block set spans a portion of a system bandwidth in a shortened transmission time interval (sTTI), wherein the sTTI includes three symbols, wherein the control region occupies the three symbols and includes control information for the UE for the sTTI, and wherein the control region and the data region are frequency division multiplexed. The operations of block 2005 may be performed according to the methods described with reference to FIGS. 1 through 12. In certain examples, aspects of the operations of block 2005 may be performed by one or more components as described with reference to FIGS. 13 through 15.

At block 2010, the UE 115 may obtain content in the sTTI based at least in part on the control information. The operations of block 2010 may be performed according to the methods described with reference to FIGS. 1 through 12. In certain examples, aspects of the operations of block 2010 may be performed by one or more components as described with reference to FIGS. 13 through 15.

Process 2000 may include additional aspects, such as any single aspect or any combination of aspects described below and/or in connection with one or more other processes described herein.

In some aspects, the data region occupies the three symbols. In some aspects, the control region includes a first portion that includes downlink control information and a second portion that includes uplink control information. In some aspects, the first portion and the second portion are frequency division multiplexed. In some aspects, the data region is located between the first portion and the second portion within the resource block set. In some aspects, the data region is a reallocated data region.

In some aspects, one or more resources to be used for the data region are signaled in the control region. In some aspects, the control region is configured with a demodulation reference signal (DMRS) based reference signal demodulation scheme or a cell-specific reference signal (CRS) based reference signal demodulation scheme. In some aspects, the data region is configured with a demodulation reference signal (DMRS) based reference signal demodulation scheme. In some aspects, the three symbols include a first symbol that occurs before a second symbol that occurs before a third symbol, and wherein one or more demodulation reference signal (DMRS) signals from at least one of the first symbol or the second symbol are used to demodulate information in the third symbol.

Although FIG. 20 shows example blocks of method 2000, in some implementations, method 2000 may include additional blocks, fewer blocks, different blocks, or differently arranged blocks than those depicted in FIG. 20. Additionally, or alternatively, two or more of the blocks of method 2000 may be performed in parallel.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   identifying a resource block set that includes a first portion and a second portion,
      wherein the resource block set spans a portion of a system bandwidth in a shortened transmission time interval (sTTI),
      wherein the sTTI includes three symbols,
      wherein the three symbols include a first symbol, a second symbol, and a third symbol,
      wherein each of the first portion and the second portion occupies the first symbol, the second symbol, and the third symbol,
      wherein the first portion includes downlink control information in the first symbol and the second symbol,
      wherein the first portion includes a first portion of reallocated data in the first symbol, the second symbol, and the third symbol,
      wherein the second portion includes uplink control information in the first symbol and the second symbol,
      wherein the second portion includes a second portion of the reallocated data only in the third symbol,
      wherein the third symbol is occupied only by the reallocated data,
      wherein the first symbol occurs before the second symbol,
      wherein the second symbol occurs before the third symbol, and
      wherein one or more signals from the first symbol and the second symbol are used to demodulate information in the third symbol; and
   obtaining content in the sTTI.

2. The method of claim 1, wherein the first portion and the second portion are frequency division multiplexed.

3. The method of claim 1, wherein the portion of the reallocated data is located between the downlink control information and the uplink control information in the first portion and the second portion.

4. The method of claim 1, wherein one or more resources to be used for the reallocated data are signaled in one or more of the downlink control information or the uplink control information.

5. The method of claim 1, wherein one or more of the downlink control information or the uplink control information is configured with a demodulation reference signal (DMRS) based reference signal demodulation scheme or a cell-specific reference signal (CRS) based reference signal demodulation scheme.

6. The method of claim 1, wherein the reallocated data is configured with a demodulation reference signal (DMRS) based reference signal demodulation scheme.

7. The method of claim 1,
wherein the one or more signals are one or more demodulation reference signal (DMRS) signals.

8. The method of claim 1,
wherein the downlink control information is for the UE, and
wherein the uplink control information is for a different UE.

9. The method of claim 1, wherein the one or more signals from the first symbol and the second symbol are used to demodulate information in the third symbol according to a demodulation rule.

10. The method of claim 9,
wherein the demodulation rule is indicated in a resource management block configuration, and
wherein the resource management block configuration is indicated to the UE during a radio resource control (RRC) connection configuration.

11. The method of claim 1, wherein the one or more signals are one or more cell-specific reference signal (CRS) signals.

12. An apparatus for wireless communication, comprising:
a memory; and
at least one processor coupled to the memory and configured to:
identify a resource block set that includes a first portion and a second portion,
wherein the resource block set spans a portion of a system bandwidth in a shortened transmission time interval (sTTI),
wherein the sTTI includes three symbols,
wherein the three symbols include a first symbol, a second symbol, and a third symbol,
wherein each of the first portion and the second portion occupies the first symbol, the second symbol, and the third symbol,
wherein the first portion includes downlink control information in the first symbol and the second symbol,
wherein the first portion includes a first portion of reallocated data in the first symbol, the second symbol, and the third symbol,
wherein the second portion includes uplink control information in the first symbol and the second symbol,
wherein the second portion includes a second portion of the reallocated data only in the third symbol,
wherein the third symbol is occupied only by the reallocated data,
wherein the first symbol occurs before the second symbol,
wherein the second symbol occurs before the third symbol, and
wherein one or more signals from the first symbol and the second symbol are used to demodulate information in the third symbol; and
obtain content in the sTTI.

13. The apparatus of claim 12, wherein the first portion and the second portion are frequency division multiplexed.

14. The apparatus of claim 12, wherein the portion of the reallocated data is located between the downlink control information and the uplink control information in the first portion and the second portion.

15. The apparatus of claim 12, wherein one or more resources to be used for the reallocated data are signaled in one or more of the downlink control information or the uplink control information.

16. The apparatus of claim 12, wherein one or more of the downlink control information or the uplink control information is configured with a demodulation reference signal (DMRS) based reference signal demodulation scheme or a cell-specific reference signal (CRS) based reference signal demodulation scheme.

17. The apparatus of claim 12, wherein the reallocated data is configured with a demodulation reference signal (DMRS) based reference signal demodulation scheme.

18. The apparatus of claim 12,
wherein the one or more signals are one or more demodulation reference signal (DMRS) signals.

19. The apparatus of claim 12,
wherein the downlink control information is for the apparatus, and
wherein the uplink control information is for a different apparatus.

20. The apparatus of claim 12, wherein the one or more signals from the first symbol and the second symbol are used to demodulate information in the third symbol according to a demodulation rule.

21. The apparatus of claim 20,
wherein the demodulation rule is indicated in a resource management block configuration, and
wherein the resource management block configuration is indicated to the apparatus during a radio resource control (RRC) connection configuration.

22. The apparatus of claim 12, wherein the one or more signals are one or more cell-specific reference signal (CRS) signals.

23. A non-transitory computer-readable medium storing computer executable code for wireless communication, comprising code for:
identifying a resource block set that includes a first portion and a second portion,
wherein the resource block set spans a portion of a system bandwidth in a shortened transmission time interval (sTTI),
wherein the sTTI includes three symbols,
wherein the three symbols include a first symbol, a second symbol, and a third symbol,
wherein each of the first portion and the second portion occupies the first symbol, the second symbol, and the third symbol,
wherein the first portion includes downlink control information in the first symbol and the second symbol,
wherein the first portion includes a first portion of reallocated data in the first symbol, the second symbol, and the third symbol,
wherein the second portion includes uplink control information in the first symbol and the second symbol,
wherein the second portion includes a second portion of the reallocated data only in the third symbol,
wherein the third symbol is occupied only by the reallocated data,
wherein the first symbol occurs before the second symbol,
wherein the second symbol occurs before the third symbol, and wherein one or more signals from the first symbol and the second symbol are used to demodulate information in the third symbol; and obtaining content in the sTTI.

24. The non-transitory computer-readable medium of claim 23,
wherein the first portion and the second portion are frequency division multiplexed, and
wherein the portion of the reallocated data is located between the downlink control information and the uplink control information in the first portion and the second portion.

25. The non-transitory computer-readable medium of claim 23,
wherein one or more of the downlink control information or the uplink control information is configured with a demodulation reference signal (DMRS) based reference signal demodulation scheme or a cell-specific reference signal (CRS) based reference signal demodulation scheme.

26. The non-transitory computer-readable medium of claim 23,
wherein the one or more signals are one or more demodulation reference signal (DMRS) signals.

27. The non-transitory computer-readable medium of claim 23,
wherein the one or more signals from the first symbol and the second symbol are used to demodulate information in the third symbol according to a demodulation rule indicated in a resource management block configuration, and
wherein the resource management block configuration is indicated during a radio resource control (RRC) connection configuration.

28. An apparatus for wireless communication, comprising:
means for identifying a resource block set that includes a first portion and a second portion,
wherein the resource block set spans a portion of a system bandwidth in a shortened transmission time interval (sTTI),
wherein the sTTI includes three symbols,
wherein the three symbols include a first symbol, a second symbol, and a third symbol,
wherein each of the first portion and the second portion occupies the first symbol, the second symbol, and the third symbol,
wherein the first portion includes downlink control information in the first symbol and the second symbol,
wherein the first portion includes a first portion of reallocated data in the first symbol, the second symbol, and the third symbol,
wherein the second portion includes uplink control information in the first symbol and the second symbol,
wherein the second portion includes a second portion of the reallocated data only in the third symbol,
wherein the third symbol is occupied only by the reallocated data,
wherein the first symbol occurs before the second symbol,
wherein the second symbol occurs before the third symbol, and
wherein one or more signals from the first symbol and the second symbol are used to demodulate information in the third symbol; and
means for obtaining content in the sTTI.

29. The apparatus of claim 28, wherein the portion of the reallocated data is located between the downlink control information and the uplink control information in the first portion and the second portion.

30. The apparatus of claim 28,
wherein one or more of the downlink control information or the uplink control information is configured with a demodulation reference signal (DMRS) based reference signal demodulation scheme or a cell-specific reference signal (CRS) based reference signal demodulation scheme, and
wherein the reallocated data is configured with a demodulation reference signal (DMRS) based reference signal demodulation scheme.

31. The apparatus of claim 28,
wherein the one or more signals are one or more demodulation reference signal (DMRS) signals.

32. The apparatus of claim 28,
wherein the one or more signals from the first symbol and the second symbol are used to demodulate information in the third symbol according to a demodulation rule indicated in a resource management block configuration, and
wherein the resource management block configuration is indicated during a radio resource control (RRC) connection configuration.

* * * * *